United States Patent
Zhang et al.

(10) Patent No.: US 12,185,426 B2
(45) Date of Patent: Dec. 31, 2024

(54) METHOD FOR USING REMOTE SIM MODULE AND ELECTRONIC DEVICE

(71) Applicant: Huawei Technologies Co., Ltd., Shenzhen (CN)

(72) Inventors: Qinfeng Zhang, Shenzhen (CN); Dongyang Xiu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 17/587,523

(22) Filed: Jan. 28, 2022

(65) Prior Publication Data

US 2022/0159453 A1    May 19, 2022

Related U.S. Application Data

(63) Continuation of application No. PCT/CN2020/102700, filed on Jul. 17, 2020.

(30) Foreign Application Priority Data

Aug. 1, 2019   (CN) .......................... 201910708608.2

(51) Int. Cl.
H04W 8/24     (2009.01)
H04W 4/14     (2009.01)
H04W 76/15    (2018.01)

(52) U.S. Cl.
CPC ............. *H04W 8/245* (2013.01); *H04W 4/14* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2013/0065617 A1* | 3/2013 | Peled | ...................... H04W 4/60 455/466 |
| 2016/0164883 A1 | 6/2016 | Li et al. | |
| 2016/0330611 A1* | 11/2016 | Li | ....................... H04L 67/1097 |
| 2017/0195321 A1 | 7/2017 | He et al. | |
| 2019/0007826 A1 | 1/2019 | Wane | |

FOREIGN PATENT DOCUMENTS

| | | |
|---|---|---|
| CN | 104378754 A | 2/2015 |
| CN | 104869554 A | 8/2015 |
| CN | 105024917 A | 11/2015 |
| CN | 105792185 A | 7/2016 |
| CN | 108401230 A | 8/2018 |
| CN | 110602686 A | 12/2019 |
| EP | 3082353 A1 | 10/2016 |
| EP | 3986008 A1 | 4/2022 |

* cited by examiner

*Primary Examiner* — Frantz Bataille
(74) *Attorney, Agent, or Firm* — Conley Rose, P.C.

(57) ABSTRACT

A method for using a remote subscriber identification module (SIM) and an electronic device relates to the field of communications technologies, in which when switching a SIM, a user does not need to frequently open a card slot to fetch and change a card. The method includes after receiving an indication of a user to initiate a call or send a Short Message Service (SMS) message, a terminal that makes a call or sends an SMS message to a carrier network using a phone management module and an agent module in the terminal and using a SIM disposed at a server.

20 Claims, 17 Drawing Sheets

METHOD FOR USING REMOTE SIM MODULE AND ELECTRONIC DEVICE

CROSS-REFERENCE TO RELATED APPLICATIONS

This is a continuation of International Patent Application No. PCT/CN2020/102700 filed on Jul. 17, 2020, which claims priority to Chinese Patent Application No. 201910708608.2 filed on Aug. 1, 2019. The disclosures of the aforementioned applications are hereby incorporated by reference in their entireties.

TECHNICAL FIELD

This application relates to the field of communications technologies, and in particular, to a method for using a remote subscriber identification module (SIM) and an electronic device.

BACKGROUND

With the development of technologies, functions of a terminal have been increasingly enriched. However, when using a service provided by a carrier network, the terminal needs to access the carrier network by using a SIM. The SIM is an important component for identity identification of the terminal, and the SIM may be configured to store SIM authentication information such as a unique number and a cipher key, so that an identity of a user is identified when the user performs network communication.

Existing SIMs include a pluggable SIM and an unpluggable SIM (for example, an embedded-SIM (e-SIM)). The two types of SIMs need to communicate with a modem of the terminal through a card slot in the terminal, in other words, both need to occupy a position of the card slot in the terminal. There is a dual-SIM dual-standby terminal, in other words, two SIM (pluggable SIMs or e-SIMs) may be disposed in one terminal. However, when the user needs to use three or more SIMs, the user needs to frequently replace the SIMs in two card slots, resulting in complex user operations and poor user experience.

SUMMARY

According to a method for using a remote SIM and an electronic device provided in this application, when switching a SIM, a user does not need to frequently open a card slot to fetch and change a card, thereby improving user experience.

To achieve the foregoing objective, embodiments of this application provide the following technical solutions.

According to a first aspect, a method for using a remote SIM is provided, including a terminal receives an indication that is entered by a user and that is used to initiate a call to another terminal by using a first SIM. The first SIM is disposed in a server. The terminal sends a first call request to the server by using an agent module in the terminal. The first call request includes a first identifier corresponding to the first SIM and an identifier of the other terminal. The server sends a second call request to a base station corresponding to the first SIM based on the first call request. The second call request includes a second identifier corresponding to the first SIM and the identifier of the other terminal, and the first identifier is the same as the second identifier, or the first identifier corresponds to the second identifier. The base station establishes a call connection between the server and the other terminal based on the second call request. The terminal makes a call to the other terminal through a communication connection between the terminal and the server and the call connection between the server and the other terminal.

It should be noted that, in the conventional technology, a quantity of SIMs simultaneously used by one terminal is limited, and generally there are two SIMs. However, in this application, the agent module may use the SIM disposed in the server, so that when switching a SIM in the terminal, the user does not need to frequently open a card slot to fetch and change a card. In addition, hardware costs of the terminal for supporting a plurality of SIMs can be reduced.

In addition, in the conventional technology, in either a conventional pluggable SIM solution or an e-SIM solution, a SIM communicates with a carrier network by using a modem of a terminal. Therefore, a SIM of a carrier used by the terminal should match a network standard supported by the modem of the terminal. In other words, the terminal can use only a SIM that supports a specific network standard.

However, in this application, modulation and demodulation functions on a terminal side may be implemented on the server. The server may integrate modulation and demodulation functions of a plurality of network standards. Therefore, from a perspective of the terminal side, the terminal may not be limited by a network standard supported by a modem on the terminal side. That is, a virtual card used by the terminal may use a SIM of any carrier.

In a possible implementation, the communication connection between the terminal and the server includes a short-range communication connection or a cellular network connection, and the cellular network connection is a connection corresponding to a second SIM in the terminal.

When the communication connection between the terminal and the server are the short-range communication connection, no real SIM (a pluggable SIM or an e-SIM) or no modem may be disposed in the terminal. This can reduce hardware costs of the terminal.

In a possible implementation, the agent module is disposed at a kernel layer of the terminal.

In a possible implementation, the agent module is disposed in a Radio Interface Layer Daemon (RILD) of the terminal.

In a possible implementation, that the terminal communicates with the server by using the agent module in the terminal includes that the terminal communicates with the server through a short-range communication link between the terminal and the server by using the RILD, or the terminal communicates with the server through a modem of the terminal and a cellular network link between the terminal and the server by using the RILD.

In a possible implementation, before that a terminal receives an indication that is entered by a user and that is used to make a call to another terminal by using a first SIM, the method further includes that the terminal displays a SIM management interface. The terminal receives an indication that is entered by the user and that is used to activate the first SIM. The terminal prompts to enter account information about the first SIM. The terminal receives the account information that is corresponding to the first SIM and that is entered by the user or sent by the server, and sends, to the server by using the agent module, a first activation request for activating the first SIM. The first activation request includes the account information corresponding to the first SIM.

Therefore, a method for activating the first SIM in the server by the terminal is provided.

In a possible implementation, the SIM management interface further includes information about an activated second SIM, and the second SIM is the pluggable SIM or the e-SIM disposed in the terminal.

In a possible implementation, the method further includes After verifying the account information corresponding to the first SIM, the server searches for the second identifier corresponding to the first SIM based on the account information corresponding to the first SIM, and sends a network access authentication request of the first SIM to the base station. The network access authentication request includes the second identifier corresponding to the first SIM, and the account information includes an account and a password. After completing authentication based on the network access authentication request of the first SIM, the base station notifies the terminal by using the server. The terminal displays an active state of the first SIM.

In a possible implementation, after the first SIM is activated, the method further includes that the terminal displays, on a call interface, a control for calling by using the first SIM, or displays, on a Short Message Service (SMS) message sending interface, a control for sending by using the first SIM.

It can be learned from the foregoing that a contact application interface includes an option of selecting to make a call or send an SMS message by using a virtual SIM or a real SIM. The user may select a corresponding option to implement a function such as making a call or sending an SMS message by using the virtual SIM or the real SIM. In other words, an interface for making a call or sending an SMS message by using the virtual SIM provided in this application is consistent with an interface for making a call or sending an SMS message by using the real SIM. That is, an operation method used by the user to make a call or send an SMS message by using the virtual SIM is the same as an operation method used by the user to make a call or send an SMS message by using the real SIM, and no new user operation is added.

In a possible implementation, the method further includes that the terminal receives an operation of selecting, by the user on the SMS message sending interface, the control for sending by using the first SIM. The terminal sends a first message to the server by using the agent module. The first message includes SMS message content on the SMS message sending interface, the first identifier corresponding to the first SIM, and an identifier of a receiver terminal. The server sends a second message to the base station corresponding to the first SIM based on the first message. The second message includes the SMS message content carried in the first message, the second identifier corresponding to the first SIM, and the identifier of the receiver terminal. The base station sends the second message to the receiver terminal.

In a possible implementation, after the first SIM is activated, the method further includes that the terminal obtains signal strength of the communication connection between the server and the terminal and signal strength of a communication connection between the server and the base station. The terminal determines, based on the signal strength of the communication connection between the server and the terminal and the signal strength of the communication connection between the server and the base station, signal strength corresponding to the first SIM, and displays the signal strength corresponding to the first SIM.

It can be learned that experience of using the SIM in the server by the user by using the agent module is the same as experience of using the SIM (the pluggable SIM or the e-SIM) in the terminal by the user.

In a possible implementation, after the first SIM is activated, the method further includes that the terminal obtains contact information stored in the first SIM. The terminal displays, on a contact interface, the contact information stored in the first SIM.

According to a second aspect, a method for using a remote SIM is provided, applied to a terminal including a call application module, a phone manager, and an agent module, and the method includes the following.

The call application module receives an indication that is entered by a user and that is used to initiate a call to another terminal by using a first SIM. The first SIM is disposed in a server. The call application module sends the call indication to the agent module by using the phone manager. The agent module sends a first call request to the server. The first call request includes a first identifier corresponding to the first SIM and an identifier of the other terminal. After the server establishes a call connection to the other terminal based on the first call request by using the base station, the call application module makes a call to the other terminal by using the phone manager and the agent module through a communication connection between the terminal and the server and a call connection between the server and the other terminal.

In a possible implementation, the communication connection between the terminal and the server includes a short-range communication connection or a cellular network connection, and the cellular network connection is a connection corresponding to a second SIM in the terminal.

In a possible implementation, the agent module is disposed at a kernel layer of the terminal.

In a possible implementation, the agent module is disposed in an RILD of the terminal.

In a possible implementation, that the call application module communicates with the server by using the phone manager and the agent module includes that the call application module communicates with the server through a short-range communication link between the terminal and the server by using the phone manager and the RILD, or the call application module communicates with the server through a modem of the terminal and a cellular network link between the terminal and the server by using the phone manager and the RILD.

In a possible implementation, the terminal further includes a SIM management module, and before that the call application module receives an indication that is entered by a user and that is used to make a call to another terminal by using a first SIM, the method further includes that the SIM management module displays a SIM management interface by using a display of the terminal. The SIM management module receives an indication that is entered by the user and that is used to activate the first SIM. The SIM management module displays prompt information by using the display, to prompt to enter account information about the first SIM. The SIM management module receives the account information that is corresponding to the first SIM and that is entered by the user, and sends, to the server by using the phone manager and the agent module, a first activation request for activating the first SIM. The first activation request includes the account information corresponding to the first SIM. The agent module receives a notification sent by the server that the first SIM is activated, and sends, to the SIM management module by using the phone manager, the notification that the first SIM is activated. The SIM management module displays an active state of the first SIM by using the display.

In a possible implementation, the SIM management interface further includes information about an activated second SIM, and the second SIM is a pluggable SIM or an e-SIM disposed in the terminal.

In a possible implementation, after the phone manager receives the notification sent by the agent module that the first SIM is activated, the method further includes that the phone manager broadcasts the notification that the first SIM is activated. The notification includes the first identifier corresponding to the first SIM.

In a possible implementation, after the call application module detects the notification, the SMS message application module displays, on a call interface, a control for calling by using the first SIM, or after an SMS message application module in the terminal detects the notification, the SMS message application module displays, on an SMS message sending interface, a control for sending by using the first SIM.

In a possible implementation, the method further includes that the SMS message application module receives an operation of selecting, by the user on the SMS message sending interface, the control for sending by using the first SIM. The SMS message application module sends a first message to the server by using the phone manager and the agent module. The first message includes SMS message content on the SMS message sending interface, the first identifier corresponding to the first SIM, and an identifier of a receiver terminal.

In a possible implementation, the method further includes that a notification manager of the terminal detects the notification, and obtains, by using the agent module, signal strength of the communication connection between the server and the terminal and signal strength of a communication connection between the server and the base station. The notification manager determines, based on the signal strength of the communication connection between the server and the terminal and the signal strength of the communication connection between the server and the base station, signal strength corresponding to the first SIM, and displays the signal strength corresponding to the first SIM in a status bar of the terminal.

In a possible implementation, the method further includes after detecting the notification, a contact application module of the terminal obtains, by using the agent module, contact information stored in the first SIM. The contact application module displays, on a contact interface, the contact information stored in the first SIM.

According to a third aspect, a terminal is provided, including a processor, a memory, and a touchscreen. The processor includes an agent module, the memory and the touchscreen are coupled to the processor, the memory is configured to store computer program code, the computer program code includes computer instructions, and when the processor reads the computer instructions from the memory, the terminal is enabled to perform the method in any one of the second aspect and the possible implementations of the second aspect.

According to a fourth aspect, an apparatus is provided. The apparatus is included in an electronic device, and the apparatus has a function of implementing behavior of the electronic device in any method in the foregoing aspects and the possible implementations of the foregoing aspects. The function may be implemented by hardware, or may be implemented by hardware executing corresponding software. The hardware or the software includes at least one module or unit corresponding to the functions, for example, a call application module or unit, a phone management module or unit, and an agent module or unit.

According to a fifth aspect, a computer storage medium is provided, including computer instructions. When the computer instructions are run on a terminal, the terminal is enabled to perform the method in any one of the second aspect and the possible implementations of the second aspect.

According to a sixth aspect, a computer program product is provided. When the computer program product runs on a computer, the computer is enabled to perform the method in any one of the second aspect and the possible implementations of the second aspect.

According to a seventh aspect, a chip system is provided, including a processor. When the processor executes instructions, the processor performs the method in any one of the second aspect and the possible implementations of the second aspect.

DESCRIPTION OF EMBODIMENTS

In description of the embodiments of this application, "/" means "or" unless otherwise specified. For example, AB may represent A or B. In this specification, "and/or" describes only an association relationship of associated objects and represents that three relationships may exist. For example, A and/or B may represent the following three cases: only A exists, both A and B exist, and only B exists. The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

In the description of the embodiments of this application, unless otherwise specified, "a plurality of" means two or more than two. In the embodiments of this application, the word "example" or "for example" is used to represent giving an example, an illustration, or a description. Any embodiment or design scheme described as an "example" or "for example" in the embodiments of this application shall not be explained as being more preferred or having more advantages than another embodiment or design scheme. Exactly, use of the term such as "example" or "for example" is intended to present a related concept in a specific manner.

Figure 1:
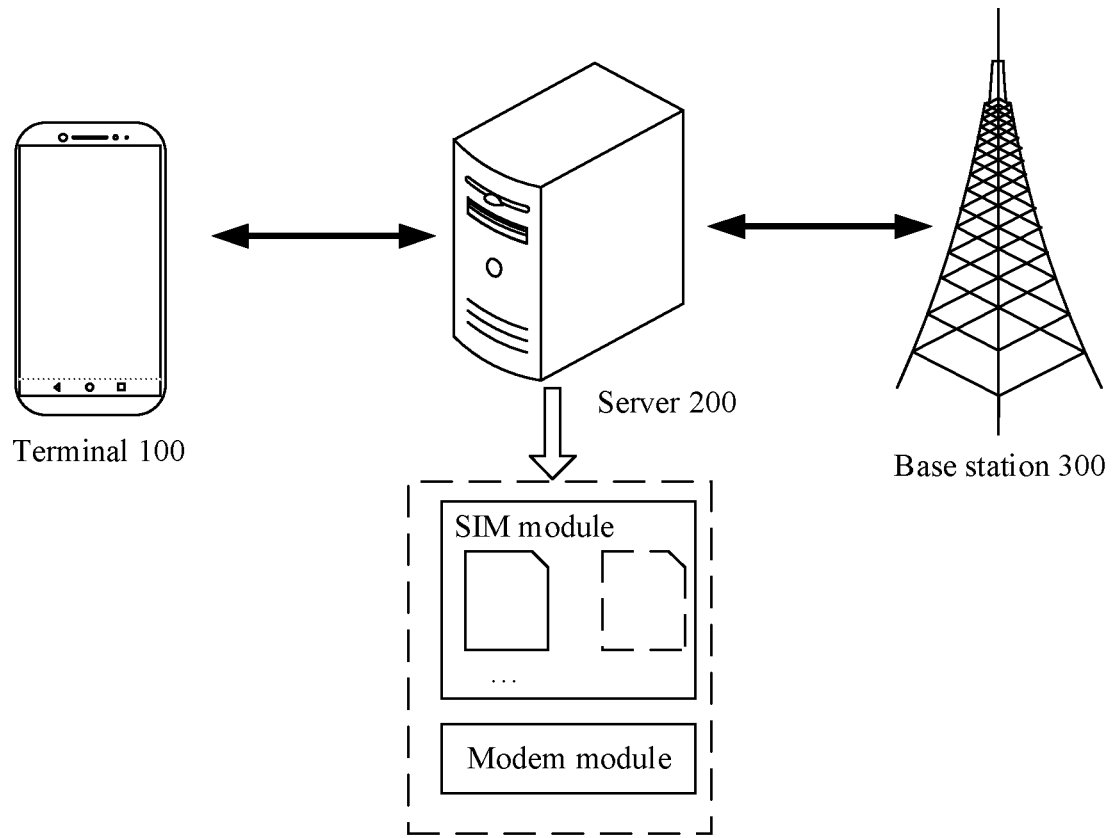
FIG. 1 is a schematic diagram of a structure of a communications system according to an embodiment of this application.

FIG. 1 is a schematic diagram of a structure of a communications system according to an embodiment of this application. The communications system includes a terminal 100, a server 200, and a base station 300.

There may be one or more servers 200. The server 200 may provide a SIM function and modulation and demodulation functions for a large quantity of terminals in a centralized manner. The server 200 may be a server provided by a cloud service provider, or may be a server provided by a carrier, or the like. This is not limited in this embodiment of this application.

The server 200 may include a SIM and a modem module. One or more pluggable SIMs may be inserted into the SIM, or one or more e-SIMS may be integrated into the SIM. When the e-SIM is used, the e-SIM can perform communication after card data is downloaded from a carrier server in advance. This is not limited in this embodiment of this application.

In the solution provided in this application, the terminal 100 may establish a communication connection to the server 200 by using one or more networks. In this way, the terminal 100 may log in to the server 200 by using a credential (for example, an account and a password). The server 200 implements the SIM function and the modulation and demodulation functions, and accesses a mobile communications network in which the base station 300 is located. Further, functions of the terminal 100 such as making a call and sending an SMS message are implemented.

It is easy to understand that, because the terminal 100 implements the SIM function by using the server 200, the SIM may not be inserted into the terminal 100, or a related module of a soft e-SIM may not be preinstalled in the terminal 100. In this application, the terminal 100 may use the SIM in the server 200 by using an agent module, to access the mobile communications network, and implement the functions such as making a call and sending an SMS message. From a user side, it may be considered that a virtual SIM is newly created in the terminal 100, so that a user can access the mobile communications network by using the virtual SIM in the terminal 100, to implement the functions such as making a call and sending an SMS message. In this application, the virtual SIM means that data (for example, authentication information such as a unique number and a cipher key) of the SIM is not stored on a terminal 100 side, instead, the data of the SIM is stored on the server 200. However, an actual SIM in this application means that the data of the SIM is stored on the terminal 100 side, for example, the pluggable SIM and the embedded e-SIM.

The one or more networks may be local area networks (LANs), or may be wide area networks (WANs), for example, an internet. The network may be implemented by using any known network communication protocol. The foregoing network communication protocol may be various wired or wireless communication protocols, for example, Ethernet, a Universal Serial Bus (USB), FireWire, BLUETOOTH, WI-FI, near-field communication (NFC), or any other appropriate communication protocol. Certainly, in some examples, the terminal 100 may alternatively be connected to the server 200 by using a cellular network communication protocol (for example, third generation (3G)/fourth generation (4G)/fifth generation (5G)). It should be noted that, in this example, the terminal 100 needs to be installed with another SIM (a pluggable SIM or an e-SIM) and a modem. However, the SIM and the modem herein are used to connect the terminal 100 to the server 200 to implement an internet access function, but are not used to connect the terminal 100 to a carrier network to implement the functions of making a call and sending an SMS message.

It may be understood that the terminal 100 may implement corresponding functions by using the SIM and the modem module on the server 200. Therefore, except a case in which the terminal 100 is connected to the server 200 by using a mobile network of the SIM, the terminal 100 may not need to access the pluggable SIM or an integrated e-SIM, or may not be disposed with the modem. In other words, the terminal 100 may implement the functions such as making a call and sending an SMS message without relying on the modem and the pluggable SIM or the e-SIM that is inserted into the terminal 100.

For example, the terminal 100 in this application may be a mobile phone, a tablet computer, a personal computer (PC), a personal digital assistant (PDA), a smartwatch, a netbook, a wearable electronic device, an augmented reality (AR) device, a virtual reality (VR) device, a vehicle-mounted device, an intelligent vehicle, a smart speaker, or a robot. A specific form of the terminal 100 is not specially limited in this application.

Figure 2A:
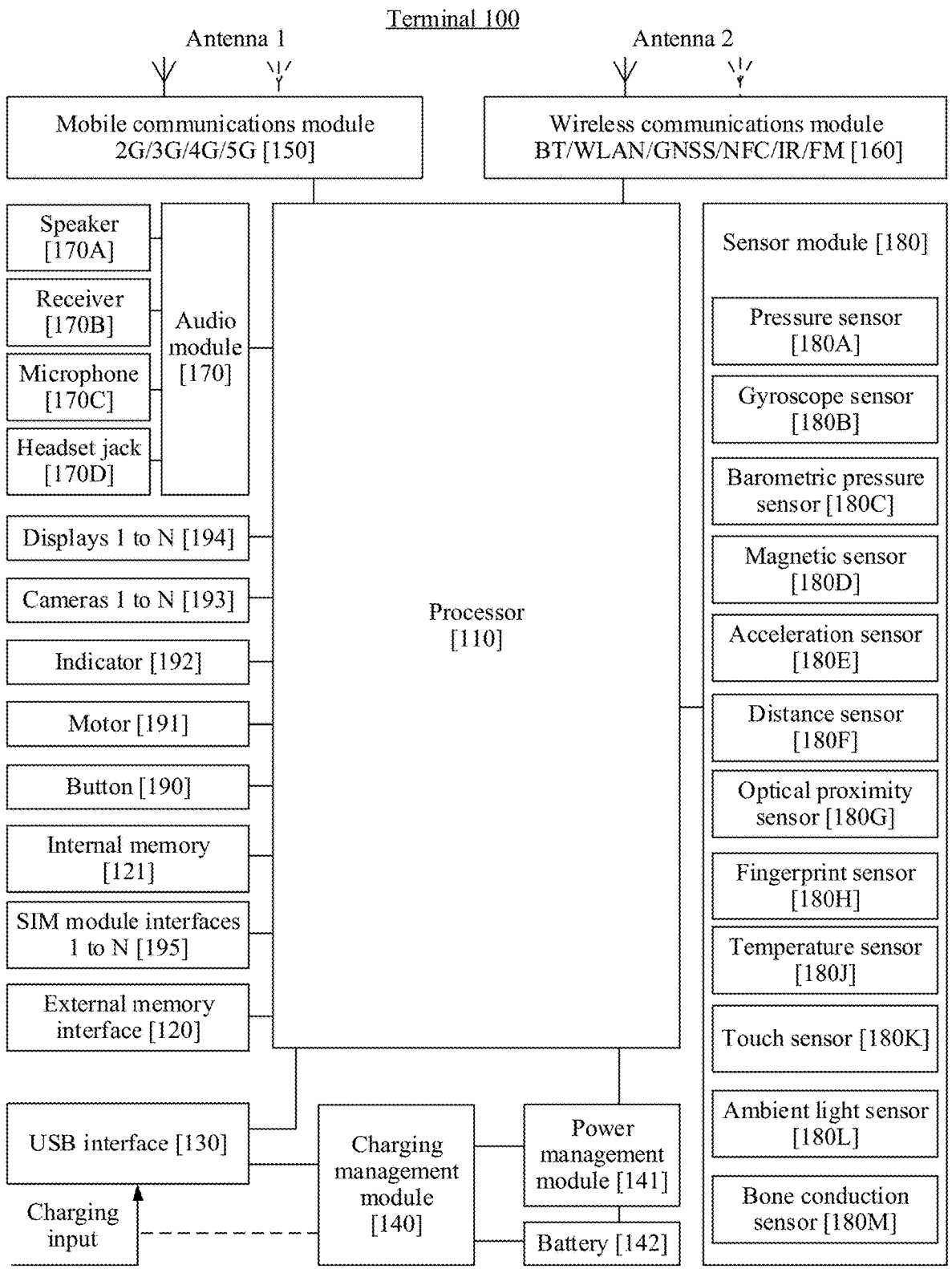
FIG. 2A is a schematic diagram 1 of a structure of a terminal according to an embodiment of this application.

FIG. 2A is a schematic diagram of a structure of the terminal 100.

The terminal 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an illustrated structure in the embodiment of the present disclosure does not constitute a specific limitation on the terminal 100. In some other embodiments of this application, the terminal 100 may include more or fewer components than those shown in the figure, or combine some components, or divide some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

As described above, in some embodiments of this application, the terminal 100 may not be disposed with a modem processor, or may not be disposed with some functions of the modem processor. Optionally, the terminal 100 may not be disposed with a baseband processor.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the instructions or the data may be invoked directly from the memory. This avoids repeated access, reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a Mobile Industry Processor Interface (MIPI), a general-purpose input/output (GPIO) interface, a SIM interface, a USB interface, and/or the like.

It may be understood that an interface connection relationship between the modules that is shown in this embodiment of the present disclosure is merely an example for description, and does not constitute a limitation on the structure of the terminal 100. In some other embodiments, the terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the terminal 100. The charging management module 140 may further supply power to an electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 each are configured to transmit and receive electromagnetic wave signals. Each antenna in the terminal 100 may be configured to cover one or more communications frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 can provide a solution, applied to the terminal 100, to wireless communication including second generation (2G), 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device with the mobile communications module 150 or another function module.

In some embodiments of this application, the terminal 100 may also log in to the server 200 by using the wireless communications module 160 and the antenna 2, and the server 200 implements a corresponding SIM function and modulation and demodulation functions, and accesses the mobile communications network, to implement functions of the terminal 100 such as making a call and sending an SMS message. Therefore, in some examples, the mobile communications module 150 and the antenna 1 may alternatively not be disposed in the terminal 100, or some functions of the mobile communications module 150 may not be disposed in the terminal 100.

The wireless communications module 160 may provide a wireless communication solution that is applied to the terminal 100 and that include a WLAN (for example, a WI-FI network), BLUETOOTH (BT), a global navigation satellite system (GNSS), frequency modulation (FM), an NFC technology, or an infrared (IR) technology. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the terminal 100 is coupled to the mobile communications module 150, and the antenna 2 is coupled to the wireless communications module 160, so that the terminal 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a Quasi-Zenith satellite system (QZSS), and/or a satellite based augmentation system (SBAS).

The terminal 100 implements the display function through the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the terminal 100 may include one or N displays 194, where N is a positive integer greater than 1.

The terminal 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a red, green, and blue (RGB) format, a luma, blue projection, red projection (YUV) format, or the like. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transform, and the like on frequency energy.

The video codec is configured to compress or decompress a digital video. The terminal 100 may support one or more video codecs. In this way, the terminal 100 can play or record videos in a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to be connected to an external storage card such as a micro Secure Digital (SD) card, to extend a storage capability of the terminal 100. The external storage card communicates with the processor 110 through the external memory interface 120, to implement a data storage function. For example, files such as music and a video are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function and an image playing function), and the like. The data storage area may store data (for example, audio data and an address book) created during use of the terminal 100, and the like. In addition, the internal memory 121 may include a high-speed random-access memory (RAM), or may include a nonvolatile memory, for example, at least one magnetic disk storage device, a flash memory, or a Universal Flash Storage (UFS). The processor 110 executes various functional applications and data processing of the terminal 100 by running instructions stored in the internal memory 121 and/or instructions stored in the memory disposed in the processor.

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The terminal 100 may listen to music by using a speaker 170A, or listen to a hands-free call.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C, to enter a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB interface 130, or may be a 3.5 millimeters (mm) Open Mobile Terminal Platform (OMTP) standard interface or cellular telecommunications industry association of the United States of America (USA) (CTIA) standard interface.

The touch sensor 180K is also referred to as a "touch device". The touch sensor 180K may be disposed on the display 194, and the touch sensor 180K and the display 194 constitute a touchscreen, which is also referred to as a "touch screen". The touch sensor 180K is configured to detect a touch operation acting on or near the touch sensor 180K. The touch sensor may transfer a detected touch operation to the application processor, to determine a type of a touch event. The display 194 may provide a visual output related to the touch operation. In some other embodiments, the touch sensor 180K may also be disposed on a surface of the terminal 100 in a position different from that of the display 194.

The button 190 includes a power button, a volume button, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM interface 195 is configured to connect to the SIM. The SIM may be inserted into the SIM interface 195 or plugged from the SIM interface 195, to implement contact with or separation from the terminal 100. The terminal 100 may support one or N SIM interfaces, where N is a positive integer greater than 1. The SIM interface 195 may support a nano-SIM, a micro-SIM, the SIM, and the like. A plurality of cards may be simultaneously inserted into a same SIM interface 195. The plurality of cards may be of a same type or of different types. The SIM interface 195 may also be compatible with different types of SIMs. The SIM interface 195 may also be compatible with an external storage card. The terminal 100 interacts with a network by using the SIM, to implement functions such as calling and data communication. In some embodiments, the terminal 100 uses an eSIM, namely, an embedded SIM. The eSIM may be embedded in the terminal 100, and cannot be separated from the terminal 100.

In some embodiments of this application, as described above, the SIM interface 195 may not be disposed in the terminal 100.

A software system of the terminal 100 may use a layered architecture, an event-driven architecture, a microkernel architecture, a microservice architecture, or a cloud architecture. In this embodiment of the present disclosure, an ANDROID system with the layered architecture is used as an example to illustrate a software structure of the terminal 100.

Figure 2B:
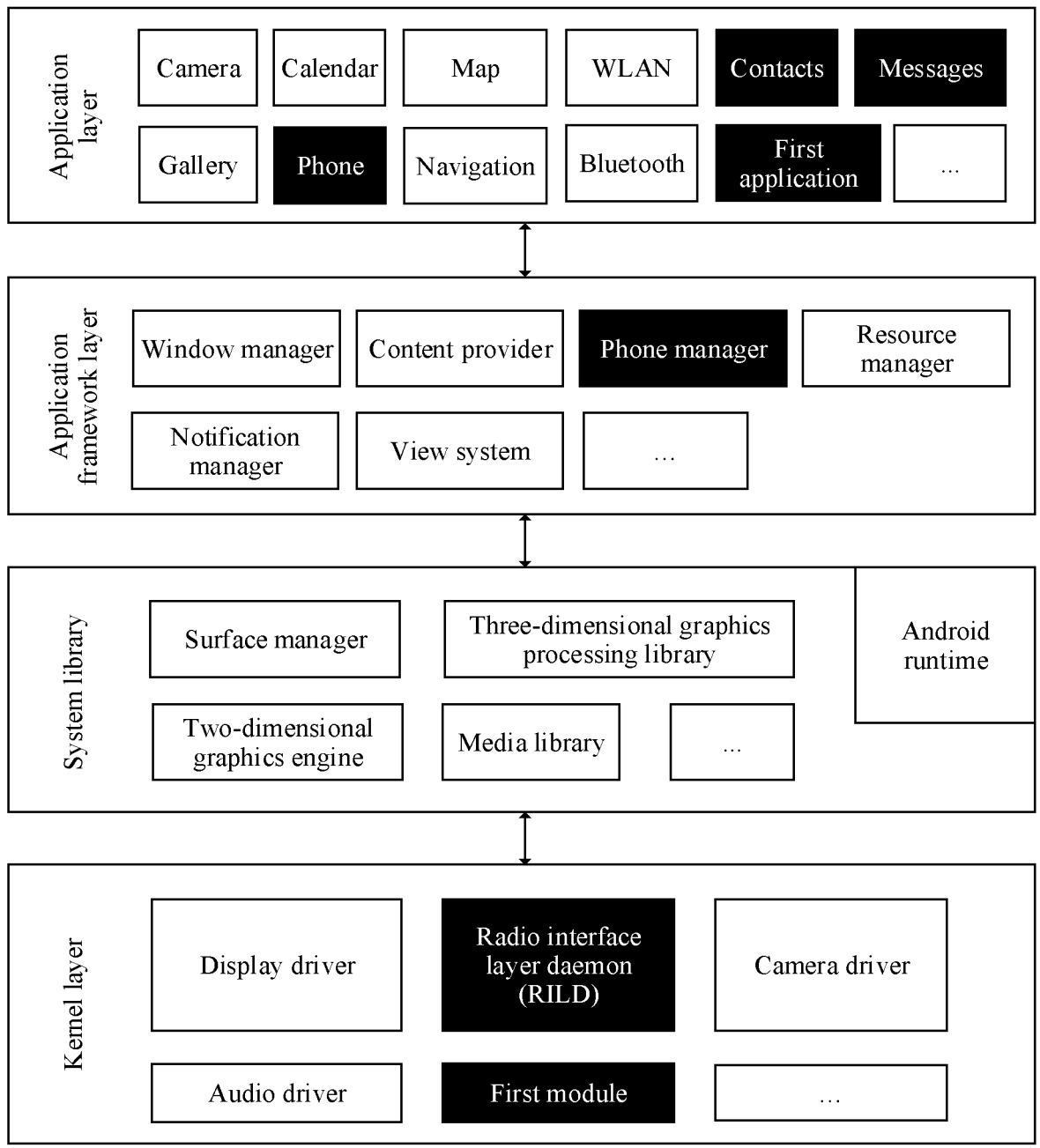
FIG. 2B is a schematic diagram 2 of a structure of a terminal according to an embodiment of this application.

FIG. 2B is a block diagram of a software structure of the terminal 100 according to an embodiment of the present disclosure.

In a layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom.

The application layer may include a series of application packages.

As shown in FIG. 2B, the application package may include applications such as camera, gallery, calendar, phone, map, navigation, WLAN, BT, music, videos, and messages.

In some embodiments of this application, the application package of the terminal may further include a first application, for example, a SIM application, or a system setting application including a multi-card management module, and is used to provide an interface for a user to create a virtual SIM, activate and deactivate the virtual SIM, and the like. Activating the virtual SIM is establishing a data transmission channel between the terminal 100 and the server 200. Deactivating the virtual SIM is disconnecting the data transmission channel between the terminal 100 and the server.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying an image. The view system may be configured to construct an application. A display interface may include one or more views. For example, a display interface including a Messages notification icon may include a text displaying view and an image displaying view.

The phone manager is configured to provide a communication function of the terminal 100, for example, management of a call status (including answering, declining, or the like).

In some embodiments of this application, the phone manager is further configured to broadcast a status of a SIM, for example, add the virtual SIM, so that another system at the application framework layer or the application at the application layer detects the newly added message and performs a corresponding operation.

The resource manager provides various resources for an application, such as a localized character string, an icon, an image, a layout file, and a video file.

The notification manager enables an application to display notification information in the status bar, and may be configured to convey a notification message. The notification message may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, the electronic device vibrates, or the indicator light blinks.

The ANDROID runtime includes a kernel library and a virtual machine. The ANDROID runtime is responsible for scheduling and management of the ANDROID system.

The kernel library includes two parts a function that needs to be invoked in JAVA language and a kernel library of ANDROID.

The application layer and the application framework layer are run on the virtual machine. The virtual machine executes JAVA files at the application layer and the application framework layer as binary files. The virtual machine is configured to perform functions such as object life cycle management, stack management, thread management, security and exception management, and garbage collection.

The system library may include a plurality of function modules, for example, a surface manager, a media library, a three-dimensional (3D) graphics processing library (for example, OpenGL for Embedded System (ES)), and a two-dimensional (2D) graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPG), and Portable Network Graphics (PNG).

The three-dimensional graphics processing library is configured to implement 3D graphics drawing, image rendering, image synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In some embodiments of this application, the kernel layer further includes a first module, namely, an agent module, configured to transmit data of an upper-layer application (such as a call application, an SMS message application, or a first application) of the terminal 100 to the server 200. For example, the first module transmits data to the server 200 through a WI-FI link or a link established by using a modem. The first module may be a newly added module, and may receive the data of the upper-layer application from an RILD of the kernel layer, or may upload the data received by the server 200 to the upper-layer application by using the RILD. Certainly, the first module may alternatively be adding a corresponding function module to an existing module, for example, adding a corresponding function module to the RILD. This is not limited in this embodiment of this application.

It can be learned that, in the conventional technology, the terminal 100 may directly invoke the modem by using the RILD to interact with a carrier network. However, in some embodiments of this application, the terminal 100 may interact with the server 200 through the WI-FI link by using the RILD. Alternatively, the terminal interacts with the server 200 by using the RILD and by using the cellular network, that is, the terminal interacts with the server 200 by using the RILD and by using the modem and the carrier network.

The RILD is briefly described. The RILD is a bridge for communication between a terminal 100 system and the modem. The upper-layer application connects to the RILD by using a socket, and the RILD connects to the modem through a serial port. Because even modems that support a same network standard have different hardware and software, modems that support different network standards have greater differences. To eliminate these differences, an abstract concept of using a phone manager is made at a framework layer in ANDROID. To be specific, when the upper-layer application invokes the modem, the upper-layer application may directly use a function protocol provided by the phone manager without paying attention to differences of different modems, and require a unified description of a lower-layer support environment. This unified description is implemented by the RILD.

Figure 3:
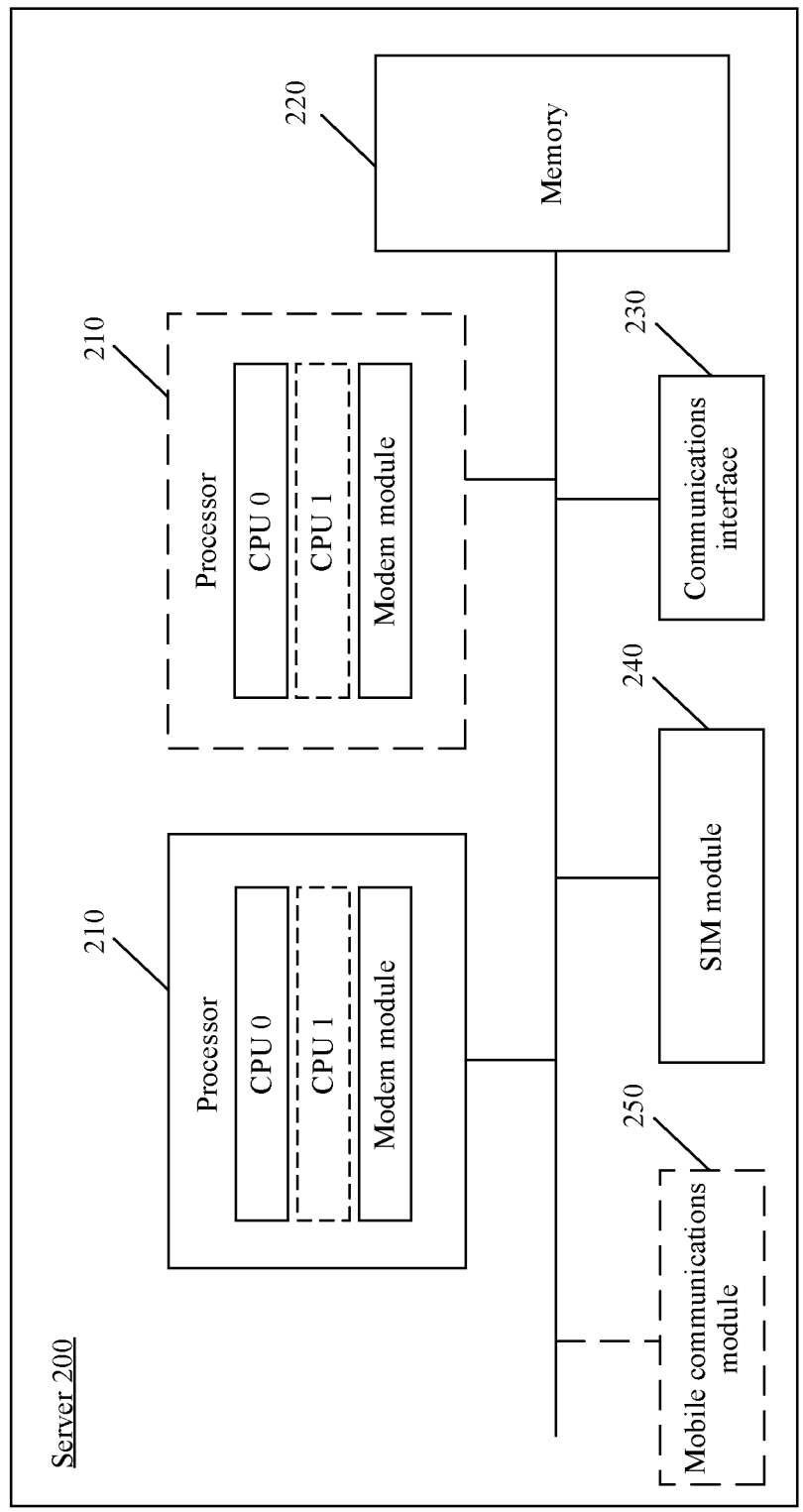
FIG. 3 is a schematic diagram of a structure of a server according to an embodiment of this application.

FIG. 3 is a schematic diagram of a structure of the server 200 according to an embodiment of this application. The server 200 includes at least one processor 210, at least one memory 220, and at least one communications interface 230.

The processor 210, the memory 220, and the communications interface 230 are connected to each other through a bus. The processor 210 may include a general-purpose central processing unit (CPU), a microprocessor, an application-specific integrated circuit (ASIC), or one or more integrated circuits configured to control program execution in the solution of this application. The processor 210 may alternatively include a plurality of CPUs, and the processor 210 may be a single-core (single-CPU) processor or a multi-core (multi-CPU) processor. The processor herein may be one or more devices, circuits, or processing cores configured to process data (for example, computer program instructions).

The memory 220 may be a read-only memory (ROM), another type of static storage device that can store static information and instructions, a RAM, or another type of dynamic storage device that can store information and instructions, or may be an electrically erasable programmable ROM (EEPROM), a compact disc (CD) ROM (CD-ROM) or another optical disc storage, an optical disc storage (including a compressed optical disc, a laser disc, an optical disc, a DIGITAL VERSATILE DISC (DVD), a BLU-RAY disc, and the like), a magnetic disk storage medium or another magnetic storage device, or any other medium that can carry or store expected program code in a form of an instruction or a data structure and can be accessed by a computer, but is not limited to this. The memory 220 may exist independently, and is connected to the processor 210 through the bus. Alternatively, the memory 220 may be integrated with the processor 210. The memory 220 is configured to store application program code for executing the solution in this application, and the processor 210 controls execution of the application program code. The processor 210 is configured to execute the computer program code stored in the memory 220, to implement a BT-based object searching method in this embodiment of this application.

The communications interface 230 may be configured to communicate with another device or communications network, such as Ethernet or a WLAN. In this embodiment of this application, the communications interface 230 may be configured to establish a communication connection to the terminal 100, and the like.

In this embodiment of this application, the processor 210 may further include a modem module and a baseband processor. The modem module may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is sent to the terminal 100 and the like through the communications interface 230.

The server 200 further includes at least one SIM 240. The SIM 240 may be disposed with a plurality of card slots for inserting a pluggable SIM, to provide a SIM function. Alternatively, the SIM 240 may integrate a module of a plurality of e-SIMs. Alternatively, the SIM 240 is disposed with a plurality of card slots and integrates a module of a plurality of e-SIMs. This is not limited in this embodiment of this application.

It may be understood that the server 200 may provide the SIM function and modulation and demodulation functions for a large quantity of terminal users. Therefore, the server 200 may purchase a relatively large quantity of SIMs (including pluggable SIMs and e-SIMs) from a carrier. In addition, the server 200 may integrate a modem module that supports a plurality of network standards. In this way, when using a SIM, the terminal user may use a SIM of any carrier without considering a network standard supported by the modem module.

In some embodiments of this application, the server 200 may further include a mobile communications module 250 and at least one antenna. The antenna is not shown in the figure.

The mobile communications module 250 may provide a solution, applied to the server 200, to wireless communication including 2G, 3G, 4G, 5G, and the like. The mobile communications module 250 may include at least one filter, a switch, a power amplifier, a low noise amplifier, and the like. The mobile communications module 250 may receive an electromagnetic wave through the antenna, perform processing such as filtering or amplification on the received electromagnetic wave, and transmit a processed electromagnetic wave to the modem module for demodulation. The mobile communications module 250 may further amplify a signal modulated by the modem module, and convert the signal into an electromagnetic wave for radiation through the antenna. In some examples, at least some function modules of the mobile communications module 250 may be disposed in the processor 210. In some other examples, at least some function modules of the mobile communications module 250 may be disposed in a same device as at least some modules of the processor 210.

In other words, the server 200 may access a carrier network by using the antenna, the mobile communications module, the modem module, the baseband processor, and the like, and implement a communication function such as making a call or sending an SMS message by using the carrier network.

In some other embodiments of this application, the server 200 may be a part of the carrier network, in other words, the server 200 is a server in the carrier network. In this case, the server 200 may also interact with a device (for example, a base station or a core network device) in the carrier network through the communications interface 230, so as to implement the communication function such as making a call or sending an SMS message.

Optionally, the server 200 may further include an output device and an input device that are not shown in the figure.

When communicating with the processor, the output device may display information in a plurality of manners. For example, the output device may be an LCD, an LED display device, a cathode-ray tube (CRT) display device, a projector, or the like. When communicating with the processor, the input device may receive an input of a user in a plurality of manners. For example, the input device may be a mouse, a keyboard, a touchscreen device, or a sensor device.

It may be understood that a structure shown in this embodiment of the present disclosure does not constitute a specific limitation on the server 200. In some other embodiments of this application, the server 200 may include more or fewer components than those shown in the figure, or combine some components, or split some components, or have different component arrangements. The components shown in the figure may be implemented by using hardware, software, or a combination of software and hardware.

All technical solutions in the following embodiments may be implemented in the terminal 100 shown in FIG. 2A or FIG. 2B and the server 200 shown in FIG. 3.

The following describes in detail the technical solutions provided in the embodiments of this application.

First, a user creates a virtual SIM by using the terminal 100. Subsequently, the user may use the created virtual module to make and answer a call, send and receive an SMS message, and the like.

It should be noted that an administrator of the server 200 may purchase at least one SIM from a carrier in advance. In some examples, the purchased SIM is a pluggable SIM, and the SIM needs to be inserted into a card slot of the server 200. In some other examples, the purchased SIM is an e-SIM, and the server 200 needs to download corresponding card data from a server of the carrier. That is, the server 200 may implement a SIM function.

Then, the user of the terminal 100 applies for enabling the virtual SIM from the server 200. That is, the terminal 100 applies to use an existing SIM on the server 200 to communicate with a carrier network. For example, the user of the terminal 100 may log in to the server 200 from an APP on the terminal 100 or from a web page to enable the virtual SIM online, or enable the virtual SIM in another manner. This is not limited herein. After the virtual SIM is successfully enabled, the terminal 100 obtains a credential for using the existing SIM on the server 200, for example, the credential may be an account and a password corresponding to the virtual SIM. The account may be a mobile number, a user name, a login name, a user identity, a terminal identity, or the like. The password may be a string of digits, letters, or symbols, or may be faces, fingerprints, or iris. A specific form of the credential is not limited in this embodiment of this application.

It should be noted that the server 200 needs to associate the credential with the existing SIM on the server 200. To be specific, the user of the terminal 100 uses the credential to activate the SIM on the server 200 corresponding to the credential, and then the terminal 100 may communicate with the carrier network by using the corresponding SIM on the server 200, to implement functions such as making a call and sending an SMS message. That is, the terminal 100 may communicate with the carrier network by using the SIM on the server 200 by using an agent module. From a user side, it may be considered that a virtual SIM is created in the terminal 100, and card data corresponding to the virtual SIM is actually card data of the corresponding SIM on the server 200. That is, a carrier, a card number, and the like corresponding to the virtual SIM are the same as a carrier and a card number of the corresponding SIM on the server 200.

It may be understood that the user of the terminal 100 may apply for subscribing to a plurality of virtual SIMs, and each virtual SIM is corresponding to one SIM on the server 200.

From the user side, experience of using the virtual SIM by the user is the same as that of using the existing SIM to implement functions such as making a call and sending an SMS message. For ease of description, a virtual SIM created by using the technical solutions of this application is referred to as a virtual card for short in the following.

Subsequently, the user may create a virtual card by using an interface provided by a first application. An example in which the first application is system settings including a multi-card management module is used herein for description.

Figure 4A:
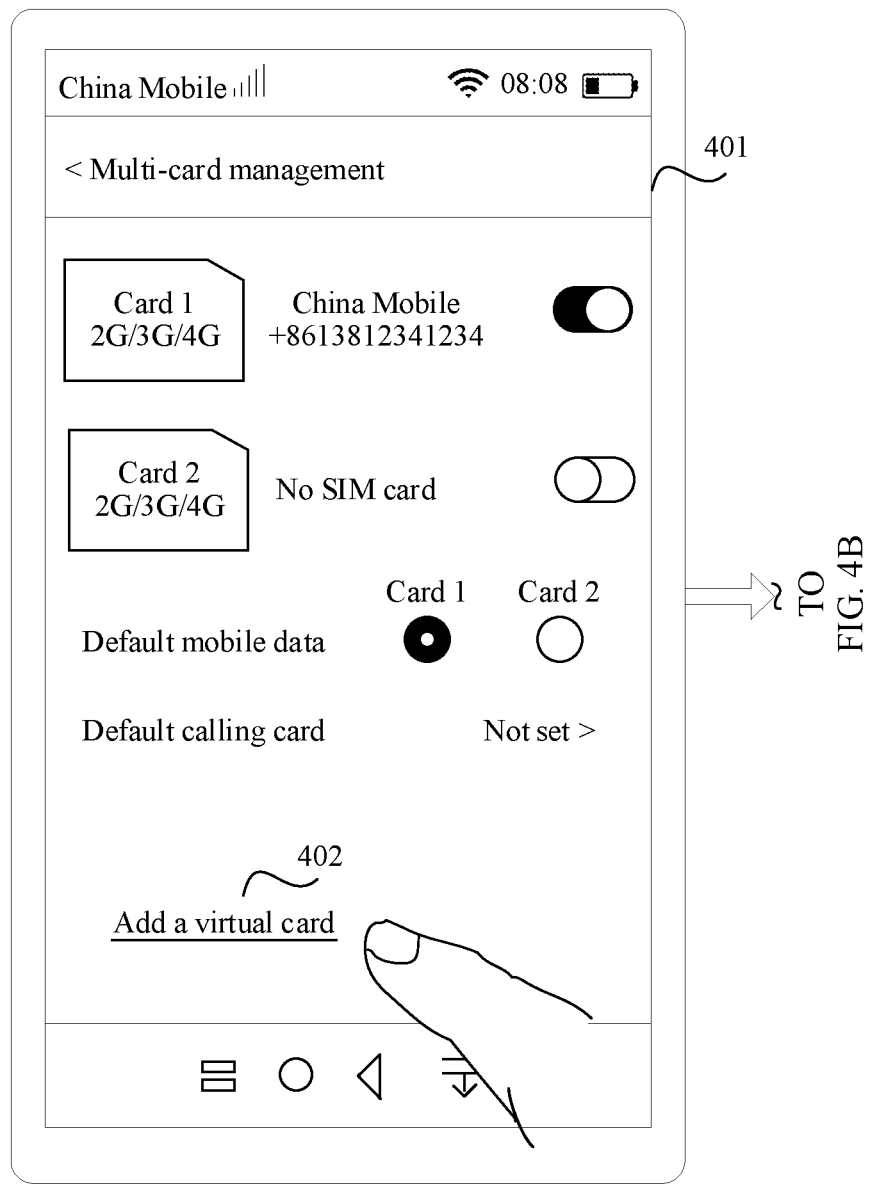
FIG. 4A, FIG. 4B, and FIG. 4C are schematic diagrams of graphical user interfaces of a terminal according to an embodiment of this application.

For example, the user may enter a multi-card management interface 401 shown in FIG. 4A by opening system settings. The multi-card management interface 401 displays information about a SIM installed in the terminal 100. For example, a SIM 1 (referred to as a card 1 in the figure) is installed in one card slot of the terminal 100, and information such as a phone number and a carrier of the SIM 1 is displayed on the multi-card management interface 401. The multi-card management interface 401 further displays information indicating that no SIM card is installed in another card slot in the terminal 100. Certainly, if the terminal 100 also supports the e-SIM, information about the e-SIM may also be displayed on the multi-card management interface 401. It should be noted that the e-SIM occupies a card slot. However, by using the created virtual card provided in this embodiment of this application, a card slot may not be occupied, and a modem of the terminal may not be used. In other words, when there is no empty card slot in the terminal, a virtual card may also be created by using the method provided in this embodiment of this application.

The multi-card management interface 401 further displays an add virtual card control 402. In response to the user tapping the control 402, the terminal 100 enters a virtual card creation interface 403 shown in FIG. 4B. The user may create a virtual card by using a pre-obtained credential. The user may enter an account and a password that are corresponding to the virtual card. Certainly, the user may also select another password mode, for example, facial recognition, fingerprint recognition, and iris recognition. After the user enters the credential, the user may tap an OK control 404 to determine to create a virtual card. In response to the user tapping the OK control 404, the terminal 100 sends the credential (for example, the account and the password) entered by the user to the server 200 for authentication.

Figure 5:
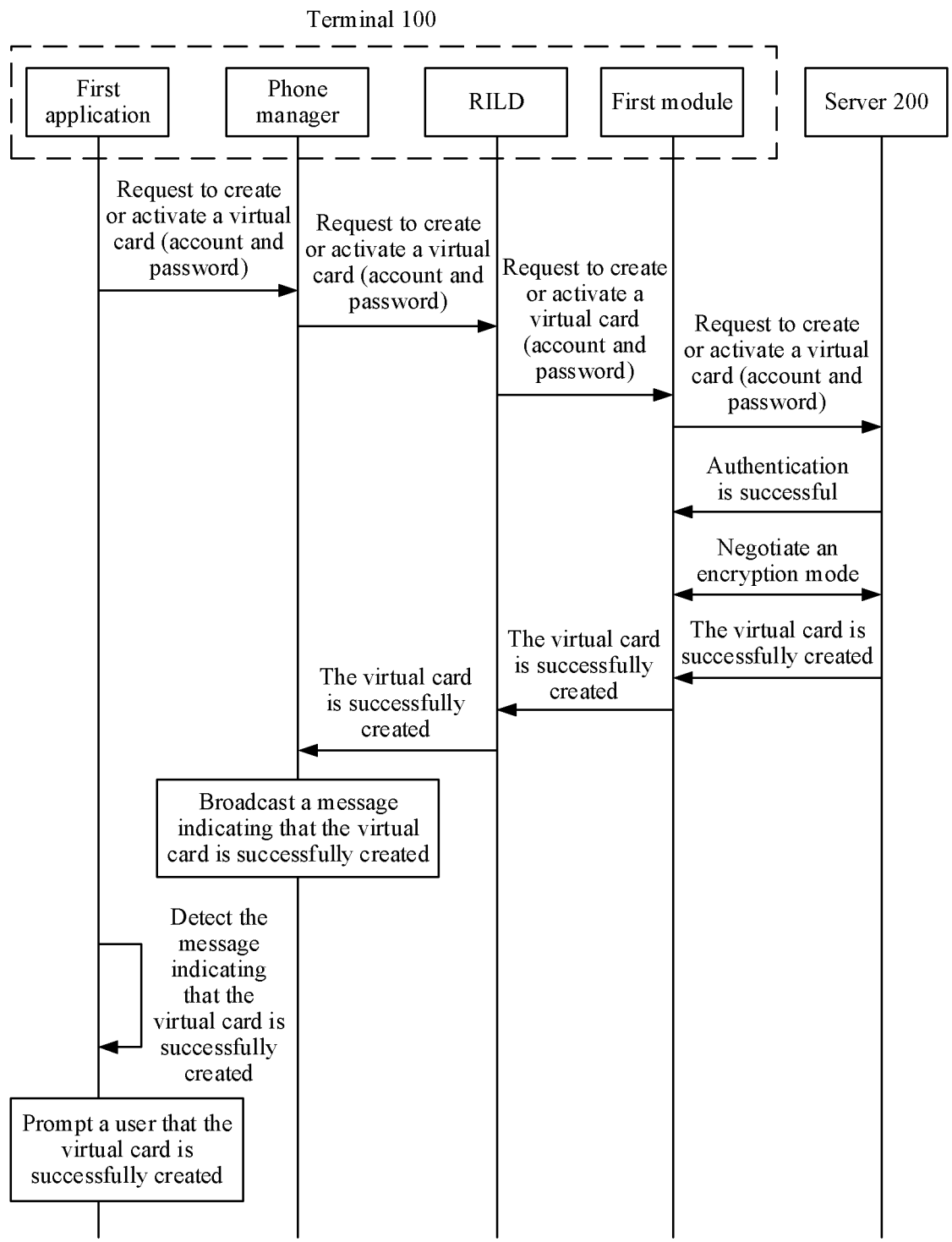
FIG. 5 is a schematic flowchart of creating a virtual SIM according to an embodiment of this application.

Refer to FIG. 5. In a specific implementation, it is detected that the user enters a credential (for example, a virtual card account and a password) on a virtual card creation interface in the first application and taps an "OK" control. The first application requests, by using a phone manager, an RILD, and a first module, the server 200 to create (or activate) a virtual card by using information about the credential entered by the user. The terminal 100 may establish a connection to the server 200 by using WI-FI or a cellular network.

The server 200 compares the received credential entered by the user with a credential stored on the server 200. If the comparison succeeds, a secure channel for data transmission is established between the terminal 100 and the server 200. Subsequently, the terminal 100 may access the carrier network by using the secure channel by using the SIM on the server 200, and implement the functions such as making a call and sending an SMS message by using the carrier network. In addition, the server 200 starts to interact with the carrier network, to load information about the SIM (a pluggable SIM card or an e-SIM card) corresponding to the virtual card. Herein, a method for loading the SIM card by the server 200 is the same as a method for loading the SIM card by a mobile phone in the conventional technology, and details are not described herein again.

The foregoing process of establishing the secure channel between the terminal 100 and the server 200 includes a process of negotiating an encryption mode between the terminal 100 and the server 200, and the like. The encryption mode may be, for example, asymmetric encryption (for example, a Rivest, Shamir, and Adleman (RSA) algorithm), a Digital signature Algorithm (DSA), or the like. For encryption-related content, refer to related technologies in the encryption field. Details are not described herein again.

After the secure channel between the terminal 100 and the server 200 is successfully established, the server 200 sends, to the terminal 100, a message indicating that the virtual card is successfully created. Optionally, the server 200 sends, to the terminal 100, the information about the SIM corresponding to the virtual card, for example, the carrier and the card number.

After the first module receives the message indicating that the virtual card is successfully created, the first module sends the message to the phone manager by using the RILD. The phone manager broadcasts the message indicating that the virtual card is successfully added. The message may include an identifier of the virtual card, and the identifier of the virtual card may be the card number that is of the SIM on the server 200 and that is corresponding to the virtual card, or may be an identifier (such as a SIM 3) allocated by the terminal 100 to the virtual card, and is used to distinguish an existing pluggable SIM, e-SIM, or the like in the terminal 100. Another application (such as a first application, a call application, a contact application, or an SMS message application) at an application layer or another system module (such as a notification manager) at an application framework layer may detect the message indicating that the virtual card is successfully added, and perform a corresponding operation, for example, record an identifier of the newly added virtual card or update an interface.

1. Update the Multi-Card Management Interface of the First Application.

Figure 4B:
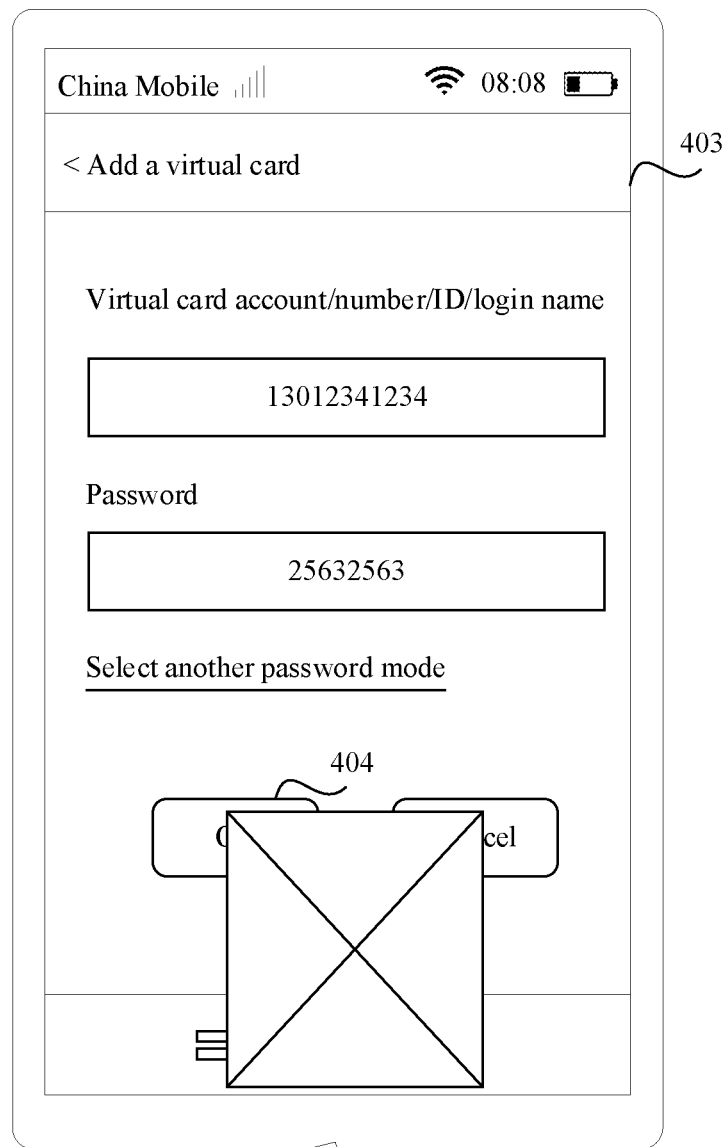
Figure 4C:
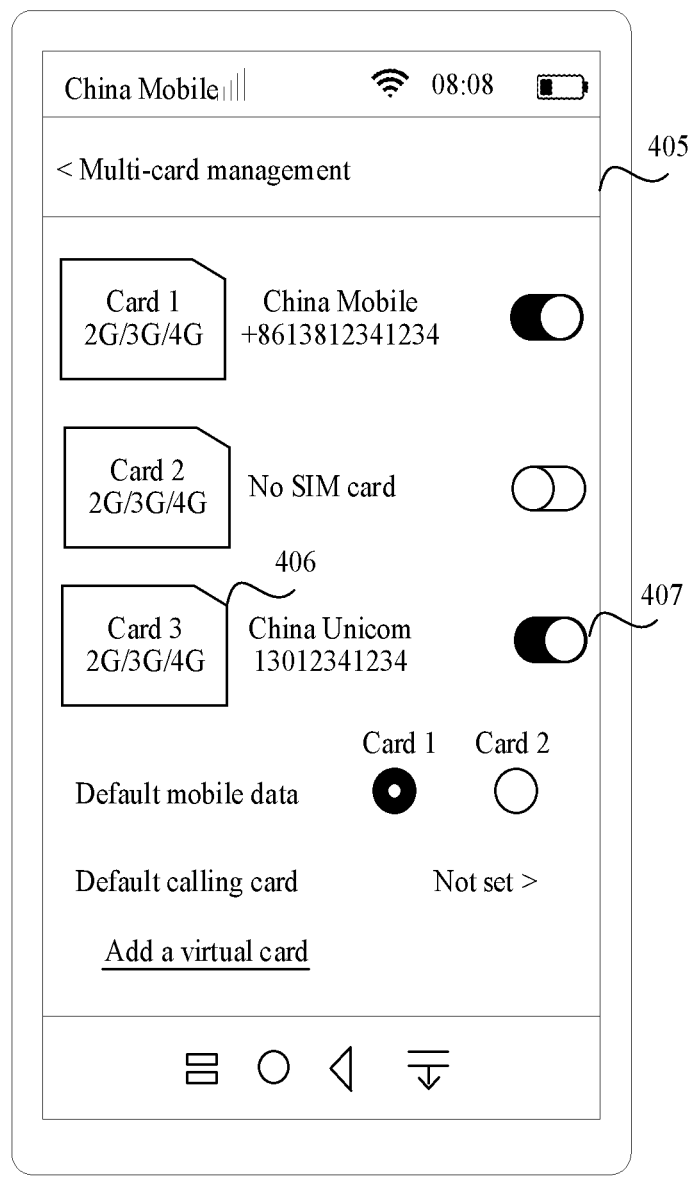

A multi-card management interface 405 shown in FIG. 4C is an example of an updated multi-card management interface. It can be learned that information such as a carrier and a phone number of the SIM 3 about the newly added virtual card (that is, the SIM 3, which is referred to as a card 3 in the figure) is displayed on the updated multi-card management interface 405. In an example, the terminal 100 may mark an icon and card information of the virtual card, to distinguish the virtual card from the existing pluggable SIM, e-SIM, or the like in the terminal 100.

The SIM 3 further corresponds to a switch control 407. The user may enable (that is, activate) or disable (that is, deactivate) the SIM 3 by using the switch control 407.

It may be understood that a process in which the user creates a virtual card may be considered as a process in which the user activates the virtual card for the first time. Subsequently, when the user does not want to use the virtual card, the user may deactivate the virtual card by using the switch control 407, that is, set the virtual card to be in an inactive state. When detecting that the user disables the SIM 3 by using the switch control 407, the terminal 100 disconnects the secure channel established between the terminal 100 and the server 200. Then, the user can no longer use the SIM 3 through the terminal 100. In some examples, the icon and the card information corresponding to the SIM 3 on the multi-card management interface 405 may be set to gray, to notify the user that the SIM 3 is unavailable.

After deactivating the virtual card, the user may still activate the virtual card again by using the switch control 407, that is, set the virtual card to be in an active state. In other words, the secure channel is established again between the terminal 100 and the server 200. Then, the user may continue to use the SIM 3.

It should be noted that when the terminal 100 creates the virtual card or activates the virtual card, the terminal 100 needs to maintain a communication connection to the server 200. In an example, the terminal 100 is connected to the server 200 by using WI-FI. In this solution, the terminal 100 may not be disposed with the SIM, a modem module, and the like. In another example, the terminal 100 is connected to the server 200 by using a cellular data network. In this solution, the terminal 100 still needs to be disposed with the SIM and the modem module, so that the terminal 100 is connected to the server 200. However, when implementing the functions such as making a call and sending an SMS message, the terminal 100 implements a SIM function and modulation and demodulation functions by using the server 200. For example, the terminal 100 implements a connection to the server 200 by using the SIM 1 installed in the terminal 100. However, the terminal 100 may use another SIM installed on the server 200 to implement the functions of making a call and sending an SMS message. It should be noted that, in this solution, when the terminal 100 performs data communication with the server 200 by using the SIM 1, a corresponding traffic fee needs to be paid. In addition, when the terminal 100 makes a call or sends an SMS message by using another SIM installed on the server 200, a corresponding call fee also needs to be paid. In this case, total costs may be relatively high. Optionally, the terminal 100 may prompt the user when the user selects the solution, so as to avoid a case that the user needs to pay a relatively high fee without awareness, or is confused about a fee that needs to be paid.

In some embodiments, when the virtual card is created, for example, after the user taps the add virtual card control 402 on the multi-card management interface 401 shown in FIG. 4A, the terminal 100 may detect whether the terminal 100 can access the internet. If the user cannot access the internet, the terminal 100 prompts the user to enable a network connection, or directly displays a network connection settings interface, so that the user can directly set the network connection.

In some other embodiments, when the virtual card is created, for example, after the user taps the OK control 404 on the virtual card adding interface 403 shown in FIG. 4B, the terminal 100 may first detect whether the terminal 100 can access the internet. If the user cannot access the internet, the terminal 100 prompts the user to enable a network connection, or directly displays a network connection settings interface, so that the user can directly set the network connection.

In still some embodiments, when the virtual card is activated, for example, after the user taps to enable the switch control 407 on the multi-card management interface 405 shown in FIG. 4C, the terminal 100 may first detect whether the terminal 100 can access the internet. If the user cannot access the internet, the terminal 100 prompts the user to enable a network connection, or directly displays a network connection settings interface, so that the user can directly set the network connection.

In still some embodiments, when the virtual card is in the active state, the terminal 100 may detect whether the communication connection to the server 200 is always maintained. For example, when the virtual card is in the active state, the terminal 100 may send a heartbeat packet to the server 200 at an interval of time, to detect whether the secure channel between the terminal 100 and the server 200 is disconnected. If it is detected that the secure channel between the terminal 100 and the server 200 is disconnected, the terminal 100 may prompt the user, so that the user selects to reactivate the virtual card, or the terminal 100 may automatically initiate a procedure of activating the virtual card.

After the procedure of reactivating the virtual card by the terminal 100 fails for preset times, the terminal 100 may also prompt the user to reselect a network or reselect a network connection manner (switch from a WI-FI connection to a cellular data network), or the terminal 100 automatically switches a network (or automatically switches a network connection manner) to re-initiate the procedure of activating the virtual card. It is determined that the virtual card is in the inactive state after the procedure of reactivating the virtual card fails for the preset times. In an example, the terminal 100 may display a notification to notify the user that the network connection is disconnected, the virtual card is unavailable, or the like. In another example, in the multi-card management interface 405, the terminal 100 directly dims the icon and the card information that are corresponding to the virtual card, to indicate that the virtual card is unavailable.

In still some embodiments, when the virtual card is in the active state, the terminal 100 may also detect signal quality of the network connection in real time. When the signal quality of the network connection is lower than a threshold, the terminal 100 may prompt the user to switch the network connection manner, or automatically switches the network connection manner. In this way, it can be ensured that the secure channel between the terminal 100 and the server 200 remains connected for a long time. This prolongs duration in which the virtual card is in the active state, and improves user experience.

It can be learned from the foregoing that, after the virtual SIM is successfully activated, a management interface for the virtual SIM in the first application is consistent with a management interface for a real SIM (the pluggable SIM and the e-SIM). In other words, after the virtual SIM is activated, an operation method for managing the virtual SIM by the user is the same as an operation method for managing the real SIM, and no new user operation is added.

2. Update the Information about the SIM in a Status Bar.

In a specific implementation, after detecting the broadcast of the newly added virtual card sent by the phone manager, the notification manager may display, in the status bar, information about the SIM corresponding to the newly added virtual card, for example, a carrier name or signal strength. In an example, the identifier corresponding to the virtual card may be distinguished from identifiers of the pluggable SIM and the e-SIM. A specific manner of distinguishing is not limited in this application.

Figure 6:
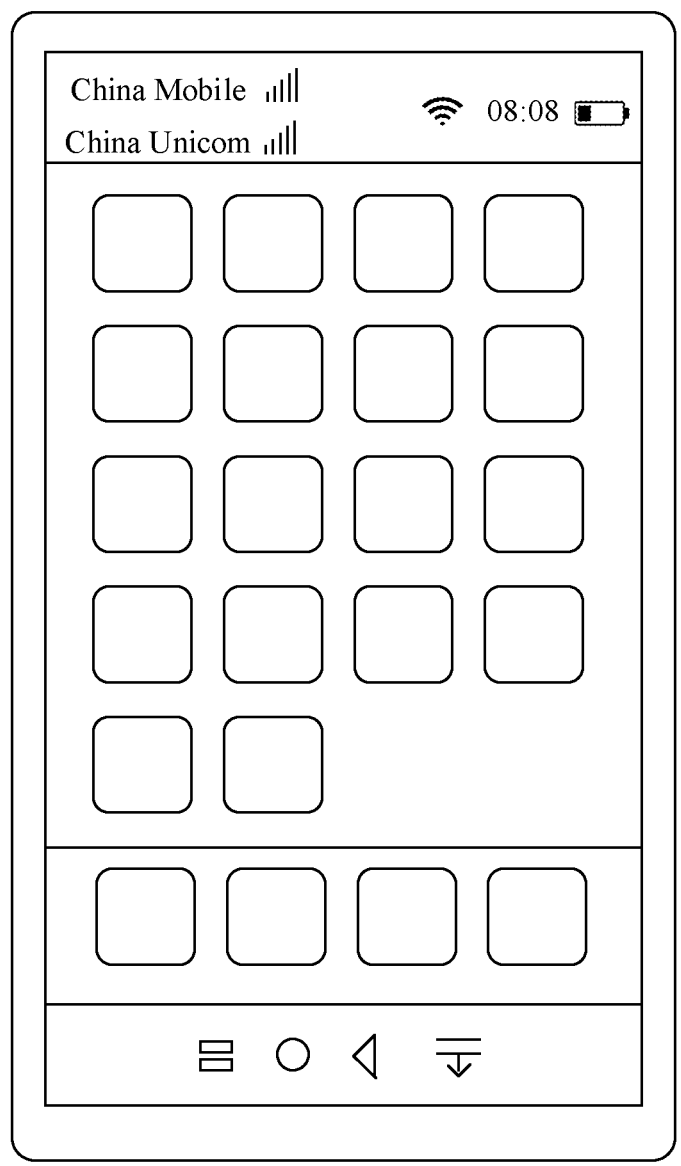
FIG. 6 is a schematic diagram of a graphical user interface of a terminal according to an embodiment of this application.

FIG. 6 is a schematic diagram of a desktop displayed by the terminal 100. A status bar of the desktop displays information about two SIMS. One is a carrier name (China Mobile) and signal strength information corresponding to the original SIM 1. The other is a carrier name (China Unicom) and signal strength information corresponding to the newly added virtual card (the SIM 3).

It should be noted that in this case, one real SIM, namely, the SIM 1, is actually installed in the terminal 100. The SIM 3 is a newly added virtual card according to the solution provided in this embodiment of this application. A real SIM corresponding to the virtual card is installed on the server 200.

Refer to the communications system in FIG. 1. In some embodiments, the signal strength information corresponding to the virtual card may be jointly determined by the terminal 100 based on quality M1 of the network connection between the terminal 100 and the server 200 and quality M2 of a signal between the server 200 and the base station 300. For example, the signal strength corresponding to the virtual card is a weighted value of M1 and M2. For another example, a signal strength value corresponding to the virtual card may be a minimum value of M1 and M2. A method for determining the signal strength corresponding to the virtual card is not limited in this application. The terminal 100 may obtain the quality M1 of the network connection between the terminal 100 and the server 200 by using a ping packet. For a specific method, refer to the conventional technology. For a method for obtaining the quality M2 of the signal between the server 200 and the base station 300, also refer to the conventional technology. The server 200 may periodically send the obtained M2 to the terminal 100, so that the terminal 100 determines, based on M1 and M2, the signal strength corresponding to the virtual card.

3. Update a Contact Application Interface.

Figure 7:
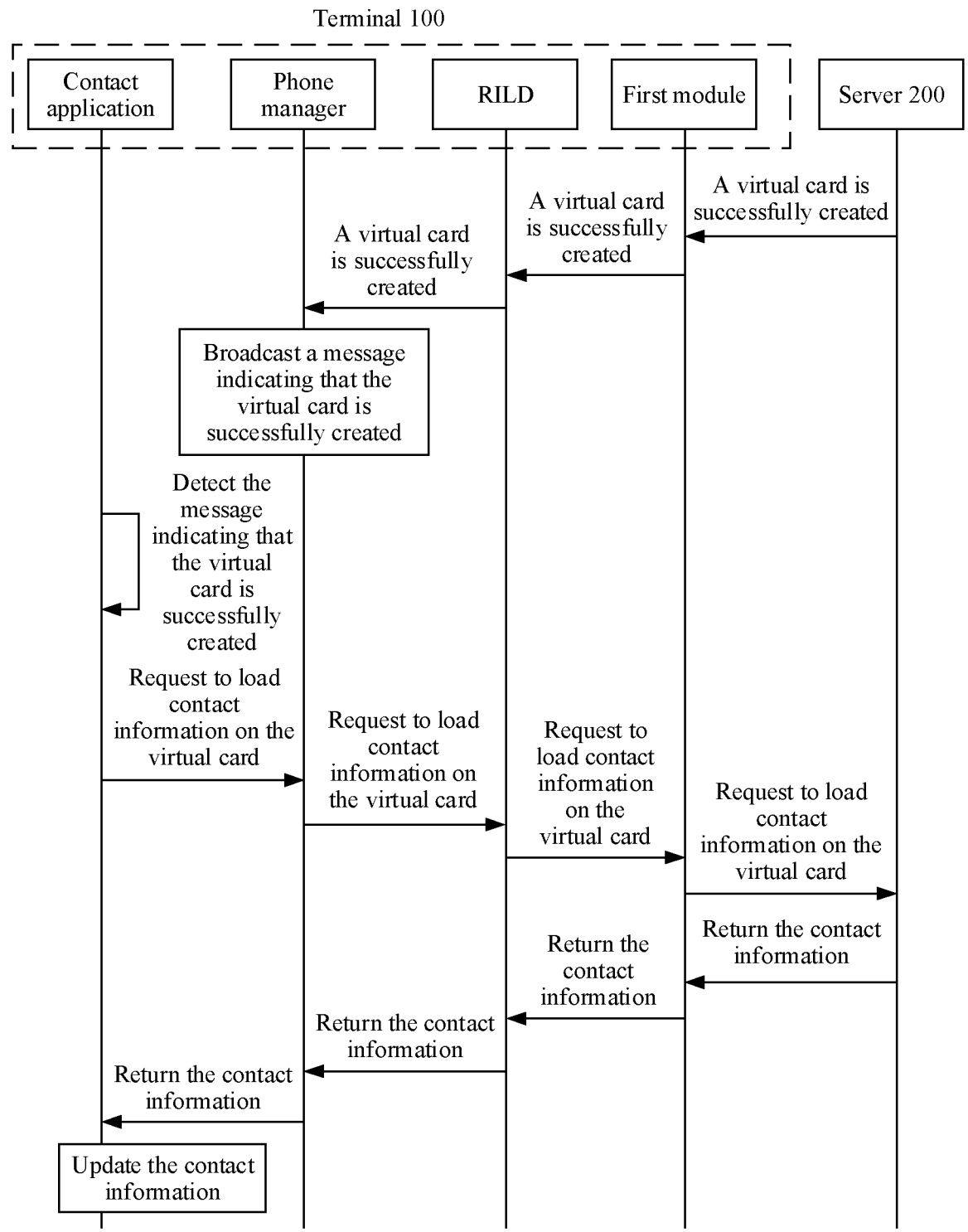
FIG. 7 is a schematic flowchart of adding a virtual SIM according to an embodiment of this application.

FIG. 7 is a schematic flowchart of updating contact information by the contact application. It can be learned that after receiving the message sent by the server 200 indicating that the virtual card is successfully created (or successfully activated), the first module of the terminal 200 sends the message to the phone manager by using the RILD. The phone manager broadcasts the message indicating that the virtual card is successfully created (or successfully activated). The message carries the identifier of the virtual card (such as the SIM 3), and the like. After detecting the message, the contact application requests, from the server 200 by using the phone manager, the RILD, and the first module, contact information that is corresponding to the virtual card and that is on the SIM of the server 200 (which can be considered as contact information on the virtual card). After querying the contact information on the virtual card, the server 200 returns the contact information to the contact application by using the first module, the RILD, and the phone manager, and the contact application may update the contact interface accordingly. The updating the contact interface means that the contact information on the virtual card is displayed on the contact interface of the terminal 100. It should be noted that the contact information on the virtual card may be initially empty. In a subsequent using process, the user may add contact information by creating. Alternatively, the user may log in to a related web page on the server 200, and add corresponding contact information and the like online.

In an example, the terminal 100 may combine original contact information on the terminal 100 with the contact information on the virtual card. That is, the terminal 100 stores the original contact information on the terminal 100 and contact information on the virtual card. Optionally, the contact information on the virtual card may be marked, to distinguish the original contact information on the terminal 100. It should be noted that a display order of the original contact information on the terminal 100 and the contact information on the newly added virtual card may be arranged in any manner that can be easily thought of by a person skilled in the art. This is not limited in this application.

In another example, the terminal 100 may always display the contact information on the virtual card. That is, when the virtual card is deactivated, the contact information on the virtual card may still be viewed on the contact interface of the terminal 100.

In still another example, when the virtual card is deactivated, the contact information on the virtual card is no longer displayed on the contact interface of the terminal 100. In this way, when the user temporarily borrows a terminal of another user to activate the virtual card, the contact information on the virtual card may be used. When the user deactivates the virtual card, the contact information on the virtual card is not stored in the terminal of the other user, which helps protect privacy of the user.

Figure 8A:
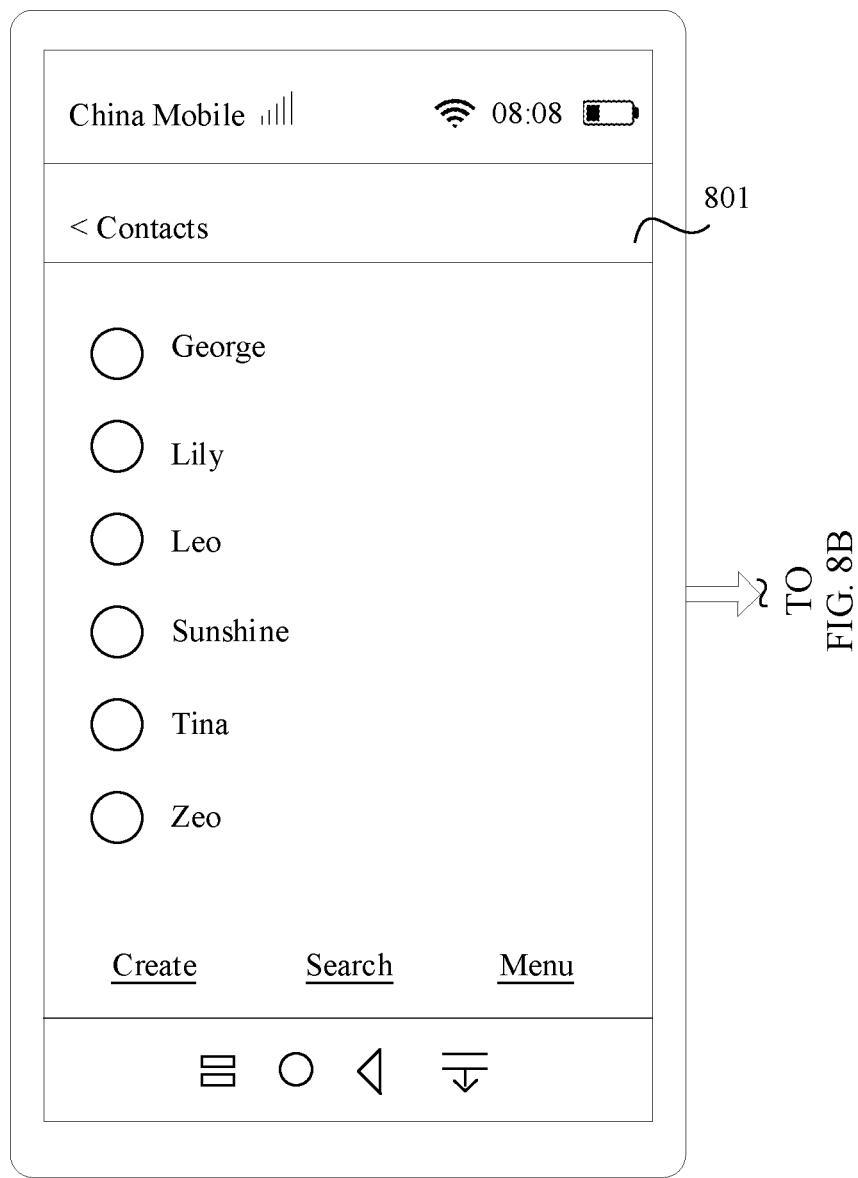
FIG. 8A, FIG. 8B, FIG. 8C, FIG. 8D, FIG. 8E, and FIG. 8F are schematic diagrams of graphical user interfaces of a terminal according to an embodiment of this application.
Figure 8B:
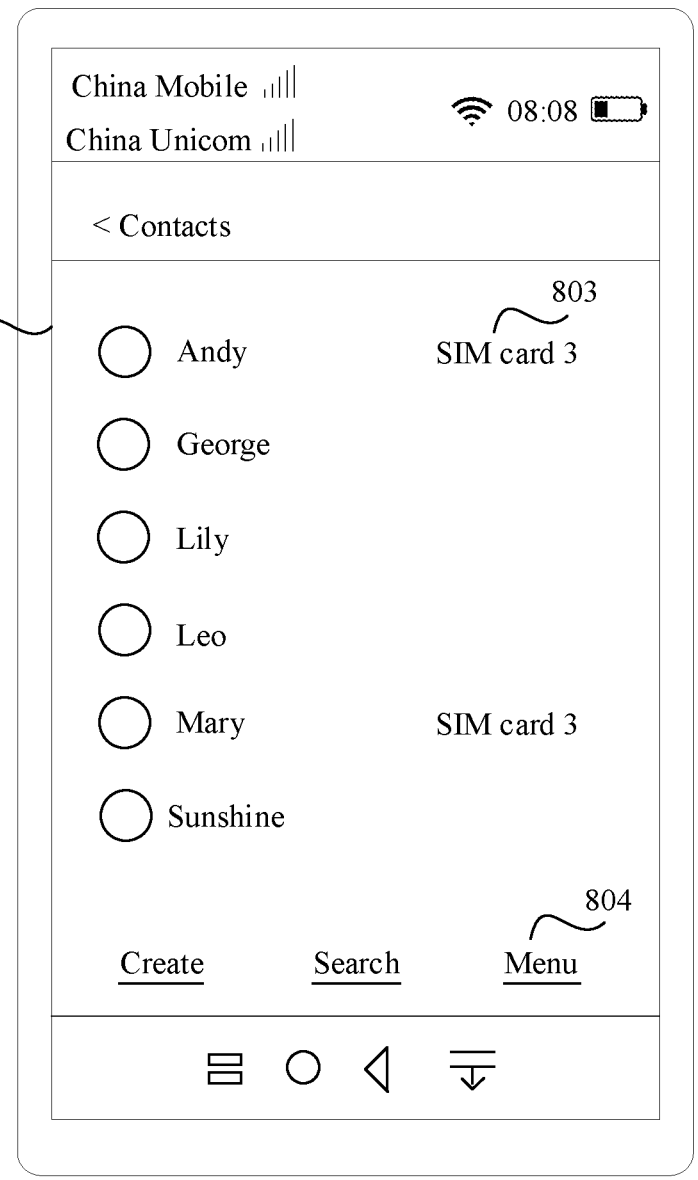

For example, a contact list 801 shown in FIG. 8A is an interface before a virtual card is created. It can be seen that information about only one SIM is displayed in the status bar. A contact list 802 shown in FIG. 8B is an interface after the virtual card is created. It can be seen that information about two SIMs is displayed in the status bar. One is information about the virtual SIM (for example, a SIM of China Unicom). Comparing the contact list 801 with the contact list 802, it can be learned that some contact information is newly added to the contact list 802, and the newly added contact information is a contact on the virtual card. A tag 803 is added to the contact on the virtual card in the figure.

Figure 8C:
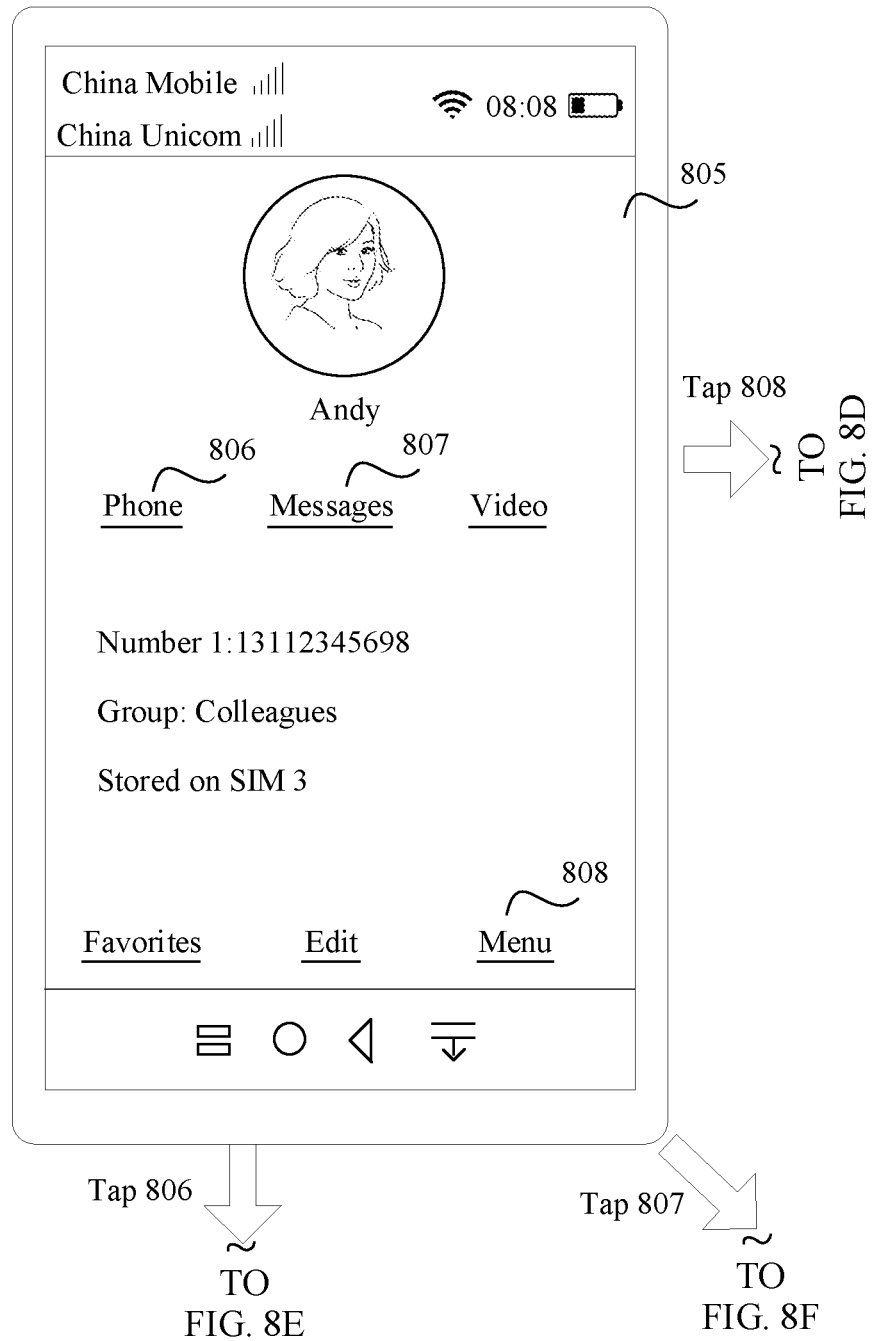

In response to the user tapping the contact "Andy", the terminal 100 displays a detailed information interface 805 of the contact "Andy" shown in FIG. 8C. The detailed information interface 805 may display a phone control 806, a messages control 807, a video control, and detailed information about the contact "Andy". The detailed information about the contact "Andy" may include an avatar of the user, a number, a group, a number storage position (stored on the SIM 3), and the like.

Optionally, the detailed information interface 805 may further display a favorites control, an editing control, and a menu control 808. The favorites control may be used to add the contact to favorites. The editing control may be used to edit information about the contact. The menu control 808 may be used to perform more other operations on the contact.

Figure 8D:
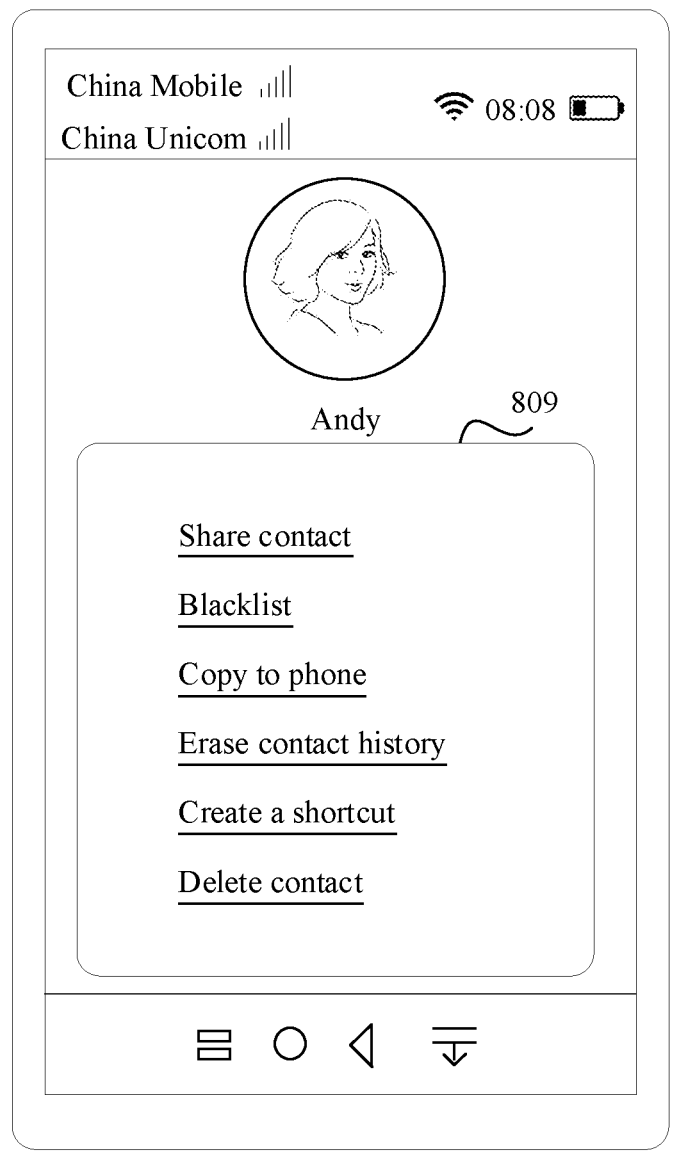

For example, in response to the user tapping the menu control 808 on the detailed information interface 805 of the contact "Andy" shown in FIG. 8C, the terminal 100 pops up a menu 809 shown in FIG. 8D. The menu 809 shows a plurality of actions that can be performed on the contact "Andy". For example, copy to phone. Because the information about the contact "Andy" is information stored on the virtual card, the information about the contact "Andy" may be stored to the terminal 100 by using the control. It may be understood that the contact "Andy" on the virtual card is used as an example for description herein. If the contact is an original contact on the terminal 100, the menu herein may be a control for copying to the SIM. Certainly, if a plurality of SIMs (including the virtual SIM) are installed in the terminal, the user may also select a specific SIM to which the information is copied. In this way, the user may also copy the contact information on the terminal 100 to the virtual card, so that the user can conveniently download the contact information from the virtual card on another terminal.

Figure 8E:
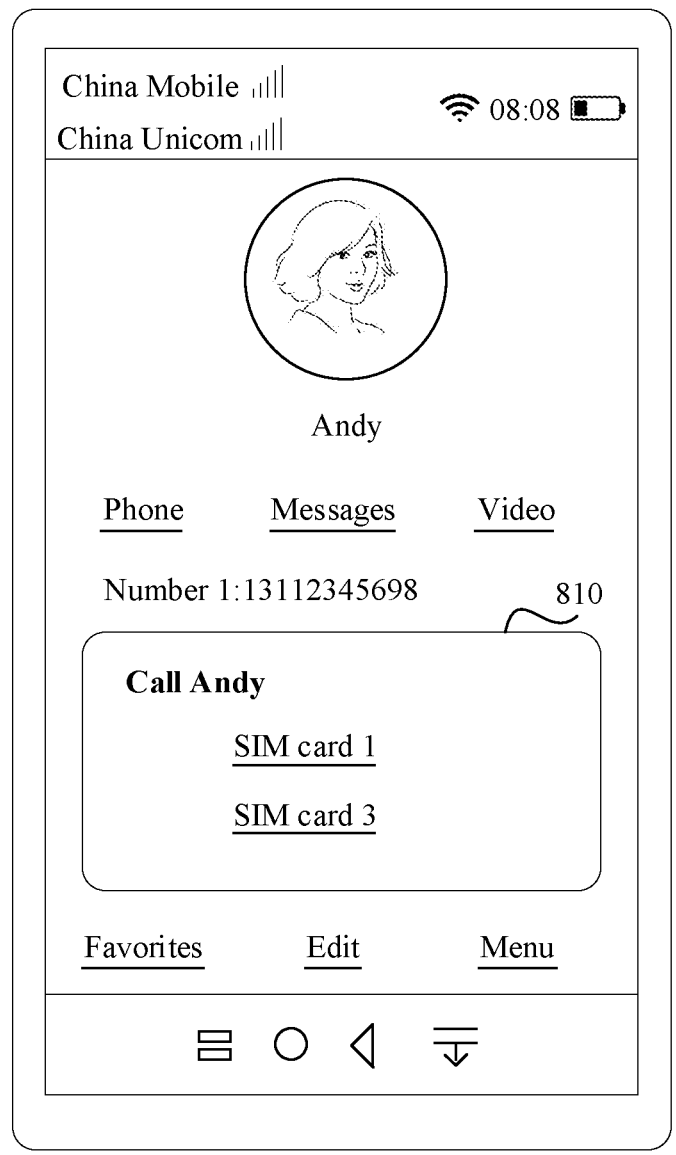

Back to the detailed information interface 805 of the contact "Andy" shown in FIG. 8C, if the user taps the phone control 806, a plurality of SIMs (the SIM 1 and the SIM 3) may be used in the terminal 100 to implement the function of making a call, and therefore, the terminal 100 pops up a menu 810 shown in FIG. 8E. The menu 810 may be used by the user to select which SIM to use to make a call to Andy. If the user selects the SIM 3 (namely, the SIM card 3 in the figure), that is, uses the virtual card, the terminal 100 displays a call interface, to notify the user that the user is calling Andy. In addition, the terminal 100 sends a call request (including data such as "Andy's" phone number, or an identifier of the virtual card) to the server 200 through the established secure channel. After receiving the call request, the server 200 interacts with the carrier network by using the real SIM card corresponding to the virtual card identifier, to implement a call to the contact Andy.

In a specific implementation, the terminal 100 receives an indication that is entered by the user and that is used to initiate a call to another terminal by using the virtual SIM. The virtual SIM corresponds to a first SIM in the server 200. The call application of the terminal sends a first call request to the server 200 by using the phone manager and an agent module. The first call request carries an identifier of the virtual SIM (or a first identifier corresponding to the first SIM) and an identifier of the other terminal. The server 200 sends, based on the first call request, a second call request to a base station corresponding to the first SIM. The second call request includes a second identifier of the first SIM. The base station establishes a call connection between the terminal 100 and the other terminal based on the second call request. Subsequently, the call application of the terminal 100 makes a call by using the phone manager and the agent module, through a connection between the terminal 100 and a server and a call connection between the base station and the other terminal.

The second identifier is the same as the first identifier, or the second identifier is corresponding to the first identifier. For example, both the first identifier and the second identifier are any one or more pieces of information of a phone number corresponding to the first SIM, an international mobile subscriber identity (IMSI), an international mobile equipment identity (IMEI), or another mobile communications network identification SIM. For another example, the first identifier is an account of the virtual SIM, and the second identifier is any one or more pieces of the information of the phone number corresponding to the first SIM, the IMSI, the IMEI, or the other mobile communications network identification SIM.

Correspondingly, when the user answers the call by using the virtual card, the other party first sends a call request to the server 200 by using the carrier network, and sends the call request to the terminal 100 through the foregoing secure channel, and the user selects whether to answer the call. After the user selects to answer the call, data between the terminal 100 and the calling party is transmitted through the secure channel.

Figure 8F:
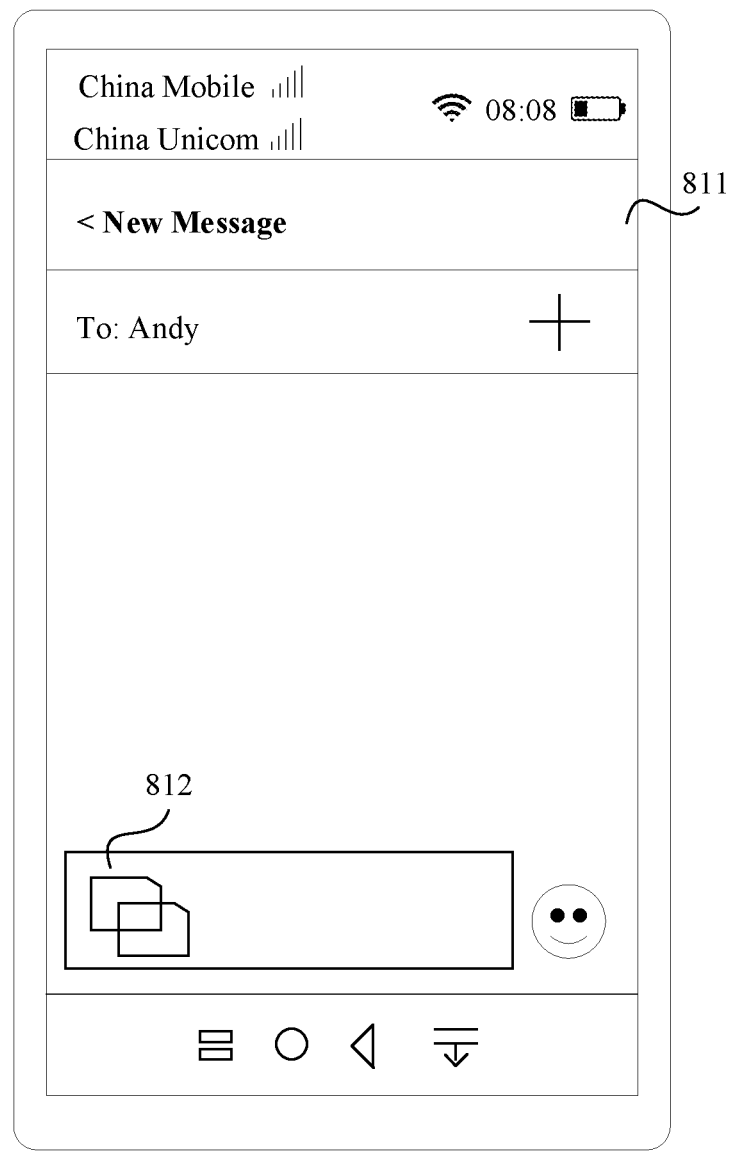

Back to the detailed information interface 805 of the contact "Andy" shown in FIG. 8C again, if the user taps the messages control 807, a plurality of SIMs (the SIM 1 and the SIM 3) may be used in the terminal 100 to implement the function of sending an SMS message, and therefore, the terminal 100 displays an SMS message editing interface 811 shown in FIG. 8F. The SMS message editing interface 811 includes a multi-SIM icon 812. The user may switch a used SIM by using the multi-SIM icon 812, or may pop up a multi-SIM option by using the multi-SIM icon 812, so that the user can select a SIM to be used. That is, the user may select an option (the SIM 3) corresponding to the virtual card, so that the edited SMS message is sent to the server 200 through the foregoing secure channel, and then the server 200 sends the SMS message to the other party through the carrier network.

In a specific implementation, the terminal 100 receives an indication that the user selects, on the SMS message sending interface, to send the SMS message to another terminal (that is, a receiver terminal) by using the virtual SIM. The virtual SIM corresponds to the first SIM in the server 200. The SMS message application of the terminal sends a first message to the server 200 by using the phone manager and the agent module. The first message includes SMS message content on the SMS message sending interface, an identifier of the virtual SIM (or the first identifier corresponding to the first SIM), and the identifier of the other terminal. The server 200 sends, based on the first message, a second message to the base station corresponding to the first SIM. The second message includes the SMS message content carried in the first message, the second identifier of the first SIM, and the identifier of the other terminal. The base station sends the second message to the other terminal based on the identifier of the other terminal carried in the second message. For descriptions of the first identifier and the second identifier, refer to the foregoing description.

When the other party replies to the SMS message, the SMS message also first reaches the server 200, and then the server 200 sends the SMS message to the terminal 100 through the foregoing secure channel. It may be understood that the server 200 stores an SMS message on the virtual card, including an SMS message sent by the terminal 100 by using the virtual card, and an SMS message that is sent by another user to the terminal 100 by using the virtual card and that is received by the terminal 100. It should be noted that the secure channel between the terminal 100 and the server 200 is established when the virtual card (the SIM 3) in the terminal 100 is in the active state. If the virtual card (the SIM 3) in the terminal 100 is in the inactive state, the server 200 receives an SMS message sent by another user, and cannot immediately transmit the SMS message to the terminal 100. Therefore, the server 200 may store the received SMS message. When the virtual card of the terminal 100 is activated again, the SMS messages may be sent to the terminal 100. In some examples, if the server 200 receives an SMS message sent by the other user, and the receiver terminal does not activate the virtual card, the server 200 may also return a message to the sender, to prompt the sender that the receiver does not activate the virtual card, so as to prevent the sender from keeping sending information to the inactive virtual card.

In an example, the terminal 100 may also mark the SMS message on the virtual card (an SMS message sent and received by the user by using the virtual card), to distinguish with an SMS message from another SIM.

In another example, the terminal 100 may keep the SMS message on the virtual card, that is, when the virtual card is deactivated, the user may still view the SMS message on the virtual card by using the terminal 100.

In still another example, the terminal 100 can view the SMS message on the virtual card when the virtual card is activated. When the virtual card is deactivated, the SMS message on the virtual card cannot be viewed.

Similar to the contact information on the virtual card, the user may also save the SMS message on the virtual card to the terminal 100, or may save the SMS message on the terminal 100 to the virtual card. Details are not described.

It can be learned from the foregoing that the contact application interface includes an option of selecting to make a call or send an SMS message by using the virtual SIM or the real SIM. The user may select a corresponding option to implement the function such as making a call or sending an SMS message by using the virtual SIM or the real SIM. In other words, an interface for making a call or sending an SMS message by using the virtual SIM provided in this application is consistent with an interface for making a call or sending an SMS message by using the real SIM. That is, an operation method used by the user to make a call or send an SMS message by using the virtual SIM is the same as an operation method used by the user to make a call or send an SMS message by using the real SIM, and no new user operation is added.

4. Update a Call Application Interface.

When the user makes a call, the user is prompted to select the SIM to be used. The user may select a SIM option corresponding to the virtual card, and the terminal 100 makes a call by using the virtual card. For other content, refer to related content of making a call and answering a call in the contact application. Details are not described herein again.

5. Update an SMS Message Application Interface.

When the user sends an SMS message, the user is prompted to select the SIM to be used. The user may select a SIM option corresponding to the virtual card, and the terminal 100 sends an SMS message by using the virtual card. For other content, refer to related content of sending an SMS message and receiving an SMS message in the contact application. Details are not described herein again.

It should be noted that, when another application on the terminal 100 needs to select a SIM, a corresponding update is also performed. Details are not described herein again.

In conclusion, in this application, the SIM function, the modulation and demodulation functions, and the like that are originally on a terminal side are handed to the server 200 for processing, and other processing is still processed by the terminal. In other words, in this application, original communication between the terminal (such as a mobile phone) and the carrier network is divided into two parts one part is interaction between the terminal 100 and the server 200, and the other part is interaction between the server 200 and the carrier network. In this way, the terminal 100 may not need to insert the pluggable SIM, or may not need to pre-integrate a module of the e-SIM, and may directly use the functions such as making a call and sending an SMS message by using a credential of the virtual card. For example, when the user changes a terminal or temporarily borrows a terminal of another user, an application such as Phone and Messages may be used by using the credential of the virtual card.

It should be noted that, in the conventional technology, a quantity of SIMs simultaneously used by one terminal is limited, and generally there are two SIMs. However, in this application, a plurality of virtual cards may be used by using credentials of a plurality of virtual cards, which also helps reduce hardware costs of the terminal for supporting a plurality of SIMs.

In addition, when switching between a plurality of virtual SIMs and between the virtual SIM and the SIM, the user may directly select the virtual SIM to be used in each application, without frequently opening a card slot to fetch or change a card.

In addition, in this application, the user may also store the contact information, an SMS message, and the like on the server 200. In this way, when the user changes a terminal or temporarily borrows a terminal of another user, corresponding data may also be conveniently downloaded from the server 200. This improves user experience.

It should be further noted that in either a conventional pluggable SIM solution or an e-SIM solution, the SIM communicates with the carrier network by using the modem of the terminal. Therefore, a SIM of a carrier used by the terminal should match a network standard supported by the modem of the terminal. In other words, the terminal can use only a SIM that supports a specific network standard.

However, in this application, modulation and demodulation functions on the terminal side may be implemented on the server 200. The server 200 may integrate modulation and demodulation functions of a plurality of network standards. Therefore, from a perspective of the terminal side, the terminal may not be limited by a network standard supported by a modem on the terminal side. That is, a virtual card used by the terminal may use a SIM of any carrier.

In addition, an operation interface of using the virtual SIM by the user is the same as an operation interface of using the real SIM, and an operation habit of the user is retained.

Figure 9:
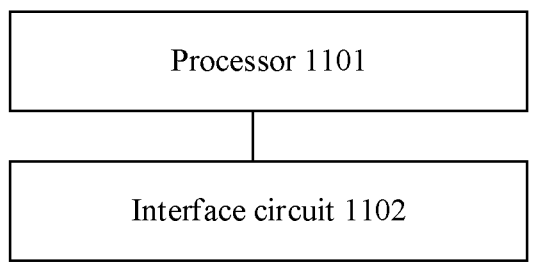
FIG. 9 is a schematic diagram of a structure of a chip system according to an embodiment of this application.

An embodiment of this application further provides a chip system. As shown in FIG. 9, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory in the terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, an electronic device is enabled to perform steps performed by the terminal 100 (for example, a mobile phone) in the foregoing embodiments. Certainly, the chip system may further include another discrete device. This is not limited in this embodiment of this application.

Figure 10:
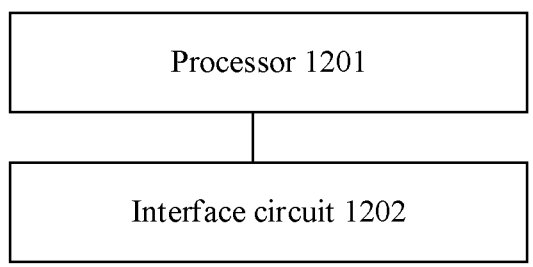
FIG. 10 is a schematic diagram of a structure of another chip system according to an embodiment of this application.

An embodiment of this application further provides a chip system. As shown in FIG. 10, the chip system includes at least one processor 1201 and at least one interface circuit 1202. The processor 1201 and the interface circuit 1202 may be interconnected through a line. For example, the interface circuit 1202 may be configured to receive a signal from another apparatus (for example, a memory of the server 200). For another example, the interface circuit 1202 may be configured to send a signal to another apparatus (for example, the processor 1201). For example, the interface circuit 1202 may read instructions stored in the memory, and send the instructions to the processor 1201. When the instructions are executed by the processor 1201, an electronic device is enabled to perform steps performed by the server 200 in the foregoing embodiments. Certainly, the chip system may further include another discrete device. This is not limited in this embodiment of this application.

It may be understood that, to implement the foregoing functions, the terminal or the like includes a corresponding hardware structure and/or software module for performing each function. A person skilled in the art should be easily aware that, in combination with the examples described in the embodiments disclosed in this specification, units, algorithms, and steps may be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present disclosure.

In the embodiments of this application, function module division may be performed on the terminal or the like based on the foregoing method example. For example, each function module may be obtained through division based on a corresponding function, or two or more functions may be integrated into one processing module. The integrated module may be implemented in a form of hardware, or may be implemented in a form of a software function module. It should be noted that, in the embodiments of the present disclosure, division into the modules is an example, and is merely logical function division. In actual implementation, another division manner may be used.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented based on a requirement. In other words, an inner structure of an apparatus is divided into different function modules to implement all or some of the functions described above. For detailed working processes of the foregoing system, apparatus, and unit, refer to corresponding processes in the foregoing method embodiments, and details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
receiving, by a first terminal from a first user of the first terminal, a first indication to initiate a call to a second user of a second terminal using a first subscriber identification module (SIM) disposed in a server, wherein the first SIM is a remote SIM at the server;
sending, by the first terminal to the server using an agent in the first terminal, a first call request for performing the call between the first user and the second user using the remote SIM at the server, wherein the first call request comprises a first identifier corresponding to the first SIM and a third identifier of the second terminal;
sending, by the server, a second call request to a base station corresponding to the first SIM based on the first call request, wherein the second call request comprises a second identifier corresponding to the first SIM and the third identifier, and wherein either the first identifier is the same as the second identifier or the first identifier corresponds to the second identifier;
establishing, by the base station, a call connection between the server and the second terminal based on the second call request; and
making, by the first terminal, a call to the second terminal through a first communication connection between the first terminal and the server and through the call connection between the server and the second terminal.

2. The method of claim 1, wherein the first communication connection comprises a short-range communication connection or a cellular network connection, and wherein the cellular network connection corresponds to a second SIM in the first terminal.

3. The method of claim 1, wherein the agent is disposed at a kernel layer of the first terminal.

4. The method of claim 3, wherein the agent is disposed in a Radio Interface Layer Daemon (RILD) of the first terminal.

5. The method of claim 4, further comprising communicating, by the first terminal, with the server through a short-range communication link between the first terminal and the server using the RILD.

6. The method of claim 4, further comprising communicating, by the first terminal, with the server through a modem of the first terminal and a cellular network link between the first terminal and the server using the RILD.

7. The method of claim 1, wherein before receiving the first indication, the method further comprises:
displaying, by the first terminal, a SIM management interface;
receiving, by the first terminal from the user, a second indication to activate the first SIM;
prompting, by the first terminal, to enter account information about the first SIM;
receiving, by the first terminal, the account information from the first user or from the server; and
sending, to the server using the agent, a first activation request for activating the first SIM, wherein the first activation request comprises the account information.

8. The method of claim 7, wherein the SIM management interface further comprises information about an activated second SIM, and wherein the activated second SIM is a pluggable SIM or an embedded SIM (e-SIM) disposed in the first terminal.

9. The method of claim 7, further comprising:
verifying, by the server, the account information;
searching for, by the server, the second identifier based on the account information;
sending, by the server and to the base station, a network access authentication request of the first SIM comprising the second identifier, wherein the account information comprises an account and a password;
completing, by the base station, an authentication based on the network access authentication request;
notifying, by the base station, the first terminal using the server; and
displaying, by the first terminal, an active state of the first SIM.

10. The method of claim 9, further comprising:
activating, by the first terminal, the first SIM; and
displaying, by the first terminal on a call interface, a first control for calling using the first SIM or displaying, by the first terminal on a Short Message Service (SMS) message sending interface, a second control for sending using the first SIM.

11. The method of claim 10, further comprising:
receiving, by the first terminal, an operation of selecting, by the first user on the SMS message sending interface, the second control;
sending, by the first terminal to the server using the agent, a first message comprising an SMS message content on the SMS message sending interface, the first identifier, and a fourth identifier of a receiver terminal;
sending, by the server and to the base station based on the first message, a second message comprising the SMS message content, the second identifier, and the fourth identifier; and
sending, by the base station, the second message to the receiver terminal.

12. The method of claim 9, further comprising:
activating, by the first terminal, the first SIM;
obtaining, by the first terminal, first signal strength of the first communication connection and second signal strength of a second communication connection between the server and the base station;
determining, by the first terminal based on the first signal strength and the second signal strength, third signal strength corresponding to the first SIM; and
displaying, by the first terminal, the third signal strength.

13. The method of claim 9, further comprising:
activating, by the first terminal, the first SIM;
obtaining, by the first terminal, contact information stored in the first SIM; and
displaying, by the first terminal on a contact interface, the contact information.

14. A method comprising:
receiving, from a first user of a first terminal, an indication to initiate a call to a second user of a second terminal using a first subscriber identification module (SIM) disposed in a server, wherein the first SIM is a remote SIM at the server;
sending, to the server using an agent in the first terminal, a call request for performing the call between the first user and the second user using the remote SIM at the server, wherein the call request comprises a first identifier corresponding to the first SIM and a second identifier of the second terminal; and
making a call to the second terminal through a communication connection between the first terminal and the server and through a call connection between the server and the second terminal.

15. The method of claim 14, further comprising further sending, using an agent of the first terminal to the server, the call request.

16. The method of claim 15, further comprising:
further receiving, using a call application component of the first terminal, the indication;
sending, by the call application component, the call request to the agent using a phone manager of the first terminal; and
further making, by the call application component using the phone manager and the agent, the call.

17. The method of claim 15, wherein the agent is disposed at a kernel layer of the first terminal.

18. The method of claim 15, wherein the agent is disposed in a Radio Interface Layer Daemon (RILD) of the first terminal.

19. The method of claim 14, wherein the communication connection comprises a short-range communication connection or a cellular network connection, and wherein the cellular network connection corresponds to a second SIM in the first terminal.

20. A first terminal comprising:
a memory configured to store computer instructions; and
a processor coupled to the memory, wherein when executed by the processor, the computer instructions cause the first terminal to:
receive, from a first user of the first terminal, an indication to initiate a call to a second user of a second terminal using a subscriber identification module (SIM) disposed in a server, wherein the first SIM is a remote SIM at the server;
send, to the server using an agent in the first terminal, a call request for performing the call between the first user and the second user using the remote SIM at the server, wherein the call request comprises a first identifier corresponding to the SIM and a second identifier of the second terminal; and
make a call to the second terminal through a communication connection between the first terminal and the server and through a call connection between the server and the second terminal.

\* \* \* \* \*